US010519259B2

(12) United States Patent
Resconi et al.

(10) Patent No.: US 10,519,259 B2
(45) Date of Patent: Dec. 31, 2019

(54) LOW MELTING PP HOMOPOLYMER WITH HIGH CONTENT OF REGIOERRORS AND HIGH MOLECULAR WEIGHT

(71) Applicant: BOREALIS AG, Vienna (AT)

(72) Inventors: Luigi Resconi, Ferrara (IT); Kristin Reichelt, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 678 days.

(21) Appl. No.: 15/027,129

(22) PCT Filed: Oct. 23, 2014

(86) PCT No.: PCT/EP2014/072763
§ 371 (c)(1),
(2) Date: Apr. 4, 2016

(87) PCT Pub. No.: WO2015/059229
PCT Pub. Date: Apr. 30, 2015

(65) Prior Publication Data
US 2016/0244539 A1 Aug. 25, 2016

(30) Foreign Application Priority Data
Oct. 24, 2013 (EP) .................................... 13190100

(51) Int. Cl.
*C08F 110/06* (2006.01)
*C08L 23/12* (2006.01)
*F16L 9/12* (2006.01)

(52) U.S. Cl.
CPC ............. *C08F 110/06* (2013.01); *C08L 23/12* (2013.01); *F16L 9/12* (2013.01); *C08L 2203/12* (2013.01); *C08L 2203/16* (2013.01); *C08L 2203/18* (2013.01); *C08L 2205/025* (2013.01)

(58) Field of Classification Search
CPC ............. C08L 2205/025; C08L 23/12; C08L 2203/12; C08L 2203/16; C08F 110/06; C08F 210/06; C08F 4/65927
USPC .......................................... 526/351; 525/240
See application file for complete search history.

(56) References Cited

U.S. PATENT DOCUMENTS

| | | | |
|---|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |

(Continued)

FOREIGN PATENT DOCUMENTS

| CN | 101563226 A | 11/1997 |
|---|---|---|
| CN | 1248198 A | 3/2000 |

(Continued)

OTHER PUBLICATIONS

Soren Randoll, Elizabeth T. Kiesewetter, Robert M. Waymouth, Selective and Regioselective Propylene Polymerization with Group 4 Bisphenolate Ether Complexes, Journal of Polymer Science Part A: Polymer Chemistry, 2012, 50, 5604-2611. (Year: 2012).*
"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).

(Continued)

*Primary Examiner* — Lee E Sanderson

(74) *Attorney, Agent, or Firm* — Leydig, Voit & Mayer, Ltd.

(57) ABSTRACT

Disclosed is a polypropylene homopolymer having a melting temperature $T_m$ of less than 150° C., 2,1 regio-defects of above 2.0% determined by $^{13}$C-NMR spectroscopy, and a weight average molecular weight $M_w$ of above 100 kg/mol. Also disclosed are a process for the preparation of the homopolymer and a polypropylene blend containing the homopolymer. Further disclosed are a pipe, sheet, film, fiber, moulded article, and extrusion coating made from the homopolymer or polypropylene blend.

14 Claims, No Drawings

(56) References Cited

U.S. PATENT DOCUMENTS

| | | |
|---|---|---|
| 5,618,771 A | 4/1997 | Parodi et al. |
| 5,691,043 A | 11/1997 | Keller et al. |
| 5,693,838 A | 12/1997 | Sangokoya et al. |
| 5,723,560 A | 3/1998 | Canich |
| 5,731,253 A | 3/1998 | Sangokoya |
| 5,731,451 A | 3/1998 | Smith et al. |
| 5,744,656 A | 4/1998 | Askham |
| 6,268,062 B1 * | 7/2001 | DeMeuse ............ B32B 27/32 428/461 |
| 6,316,562 B1 | 11/2001 | Munck et al. |
| 6,322,883 B1 | 11/2001 | Williams |
| 6,365,682 B1 | 4/2002 | Alastalo et al. |
| 6,586,528 B1 | 7/2003 | Delaite et al. |
| 6,642,317 B1 | 11/2003 | Delaite et al. |
| 7,319,125 B2 | 1/2008 | Arjunan et al. |
| 7,342,078 B2 | 3/2008 | Schottek et al. |
| 7,354,979 B2 | 4/2008 | Brant et al. |
| 7,378,472 B2 | 5/2008 | Fell et al. |
| 7,429,634 B2 | 9/2008 | Brant et al. |
| 7,569,651 B2 | 8/2009 | Schottek et al. |
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 9,181,423 B2 | 11/2015 | Kock et al. |
| 9,243,137 B2 | 1/2016 | Reichelt et al. |
| 2003/0149199 A1 | 8/2003 | Schottek et al. |
| 2004/0033349 A1 | 2/2004 | Henderson |
| 2004/0122191 A1 | 6/2004 | Arjunan et al. |
| 2004/0127654 A1 | 7/2004 | Brant et al. |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0034777 A1 | 2/2006 | Mahling et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2006/0211832 A1 | 9/2006 | Brant et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2013/0030121 A1 | 1/2013 | Alamo et al. |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203908 A1 | 8/2013 | Kock et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |

FOREIGN PATENT DOCUMENTS

| | | |
|---|---|---|
| CN | 1267310 A | 9/2000 |
| CN | 1684988 A | 10/2005 |
| CN | 1701081 A | 11/2005 |
| CN | 1823106 A | 8/2006 |
| CN | 101573231 A | 11/2009 |
| CN | 101772376 A | 7/2010 |
| CN | 101903103 A | 12/2010 |
| CN | 102869719 A | 1/2013 |
| CN | 103068574 A | 4/2013 |
| CN | 103080212 A | 5/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2013-525531 A | 6/2013 |
| JP | 2013-525532 A | 6/2013 |
| WO | WO 1987/007620 A1 | 12/1987 |

(56) References Cited

FOREIGN PATENT DOCUMENTS

| | | |
|---|---|---|
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO-2011135004 A2 * | 11/2011 ............. C08F 10/00 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

Atwood, "Chapter 6: Anionic and Cationic Organoaluminum Compounds," *Coord. Chem. Alum.*, VCH, New York, NY, pp. 197-232 (1993).

Britovsek et al., "The Search for New-Generation Olefin Polymerization Catalysts: Life beyond Metallocenes," *Angew. Chem. Int. Ed.*, vol. 38(4), pp. 428-447 (1999).

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

Cheng, "$^{13}$C NMR Analysis of Ethylene-Propylene Rubbers," *Macromolecules* 17:1950-1955 (1984).

Cimmino et al., "Thermal and mechanical properties of isotactic random propylene-butene-1 copolymers," *Polymer* 19:1222-1223 (1978).

Crispino et al., "Influence of Composition on the Melt Crystallization of Isotactic Random Propylene/1-Butene Copolymers," *Makromol. Chem.* 181:1747-1755 (1980).

(56) References Cited

OTHER PUBLICATIONS

Filip et al., "Heteronuclear decoupling under fast MAS by a rotor-synchronized Hahn-echo pulse train," *J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).
Holbrey et al., "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
McAuley et al., "On-line Inference of Polymer Properties in an Industrial Polyethylene Reactor," *AIChE Journal*, vol. 37, No. 6, pp. 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
Periodic Table (IUPAC Jun. 22, 2007).
*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hanser Publishers, Munich, pp. 956-965 (2001).
Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, 2$^{nd}$ Edition, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS—Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(10):2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).
Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
"Polyethylene Lumicene® mPE M5510 EP," Total Refining & Chemicals, Total Ecosolutions, Belgium, Aug. 2013 (2 pgs.).
European Patent Office, International Search Report in International Application No. PCT/EP2014/072763 (dated Jan. 26, 2015).
European Patent Office, Written Opinion in International Application No. PCT/EP2014/072763 (dated Jan. 26, 2015).
European Patent Office, International Preliminary Report on Patentability in International Application No. PCT/EP2014/072763 (dated Apr. 26, 2016).
Koch et al., "Evaluation of scratch resistance in multiphase PP blends," *Polymer Testing* 26: 927-936 (2007).
State Intellectual Property Office of the People's Republic of China, First Notification of Office Action in Chinese Patent Application No. 201480055005.2 (dated Nov. 23, 2016).

\* cited by examiner

LOW MELTING PP HOMOPOLYMER WITH HIGH CONTENT OF REGIOERRORS AND HIGH MOLECULAR WEIGHT

CROSS-REFERENCE TO RELATED APPLICATIONS

This patent application is the U.S. national phase of International Application No. PCT/EP2014/072763, filed on Oct. 23, 2014, which claims the benefit of European Patent Application No. 13190100.1, filed Oct. 24, 2013, the disclosures of which are incorporated herein by reference in their entireties for all purposes.

The present invention relates to a polypropylene homopolymer, a process for the preparation of such polypropylene homopolymer and a polypropylene blend comprising such polypropylene homopolymer as well as a pipe, film, sheet, fiber, moulded article or extrusion coating comprising such polypropylene homopolymer or polypropylene blend.

In practice, metallocene catalysts are used in the manufacture of polyolefins such as polyethylenes and polypropylenes. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

In particular, polypropylenes prepared by using an isospecific, $C_2$-symmetric metallocene provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327.

The presence of such regio-defects is a sufficient (although not necessary) feature to unambiguously identify a polypropylene as produced with a metallocene catalyst. The most common regio-defect, present in almost all isotactic polypropylenes produced with highly isospecific metallocene catalysts, is the 2,1e defect.

There are several documents describing polypropylenes with a high content of regio-defects. For example, in Organometallics 1996, 15, 5046 and JACS 1998, 120, 2308, it is referred to metallocene rac-$C_2H_4$(4,7-$Me_2$Ind)$_2$$ZrCl_2$ producing polypropylene with 1.8% regio-defects, a melting temperature of 131° C., but a very low molecular weight of only 6,700. U.S. Pat. No. 5,504,172 refers to an isotactic polypropylene having a content of 2,1e-regio-defects of 0.7 to 1.1%. WO 2011/135004 A2 and WO 2011/135005 A2 describe a propylene homopolymer with a melting temperature of less than 147° C., a percentage of 2,1 defects of at least 1% and a xylene soluble fraction of less than 0.5 wt.-%. In particular, it is disclosed that the propylene homopolymer has a percentage of 2,1 defects of below 1.8%.

It is known that, by introducing defects into the polymer chain, such as comonomers, stereo-errors or regio-defects, the physical properties of polypropylene can be modified. In particular, by increasing the amount of chain defects, crystallinity and melting point of polypropylene can be reduced whereupon a soft material can be obtained. These properties are advantageous for certain applications. Such chain defects can be introduced by copolymerization (introducing comonomer units in the chain) or by modifying the chemical structure of the catalyst (that is, modifying its selectivity) in order to allow more stereo- or regio-defects to be formed during polymerization.

In the case of regio-defects, the described propylene homopolymers have the disadvantage that an amount of 2,1 regio-defects of above 1.8% in the polypropylene chain is not achieved and, furthermore, that already an increase in 2,1 regio-defects usually causes a significant decrease of the molecular weight of the propylene homopolymer.

Therefore, there is a continuous need for alternative propylene homopolymers having different polymer properties than existing propylene homopolymers, and especially having an increased amount of 2,1 regio-defects which in turn reduce the melting temperature of the polymer ($T_m$), while at the same time keeping the molecular weight of the propylene homopolymers on a high level.

Accordingly, it is an objective of the present invention to provide a new propylene homopolymer. Another objective is to provide a propylene homopolymer being prepared with a specific tailored catalyst system. A further objective of the present invention is to provide a propylene homopolymer having a high amount of 2,1 regio-defects and, especially, an amount of 2,1 regio-defects of above 2.0%. Another objective of the present invention is to provide a propylene homopolymer having a low melting temperature $T_m$. A further objective of the present invention is to provide a propylene homopolymer having a low tensile modulus and a high tensile strain at break. A still further objective is to provide a propylene homopolymer which has a high molecular weight, as measured by its melt flow rate (MFR), intrinsic viscosity (IV) or gel permeation chromatography (GPC), and at the same time a low xylene soluble fraction at room temperature.

The foregoing and other objectives are solved by propylene homopolymer (H-PP1), having a) a melting temperature $T_m$ of less than 150° C., b) 2,1 regio-defects of above 2.0% determined by $^{13}$C-NMR spectroscopy, and c) a weight average molecular weight $M_w$ of above 100 kg/mol.

The inventors surprisingly found out that the foregoing propylene homopolymer (H-PP1) according to the present invention is obtained by preparing the propylene homopolymer (H-PP1) with a specific tailored catalyst system at a specific polymerization temperature. This specific tailored catalyst system enables a skilled person to produce a propylene homopolymer (H-PP1) featured by a high amount of 2,1 regio-defects and a low melting temperature $T_m$, while keeping the molecular weight of the propylene homopolymer (H-PP1) still at a high level.

According to another aspect of the present invention, a process for the preparation of such a propylene homopolymer (H-PP1) is provided, the process comprising the step of polymerizing propylene at a polymerization temperature of less than 60° C., preferably not more than 55° C., in the presence of a solid catalyst system, said solid catalyst system comprises (i) a complex of formula (I)

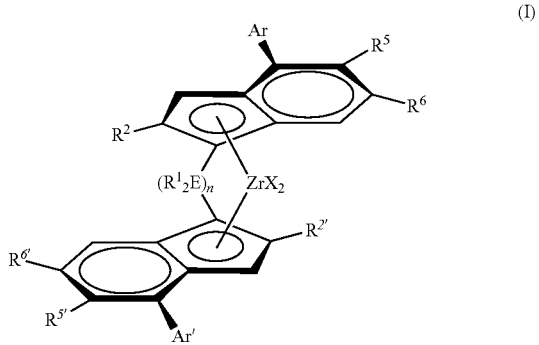

wherein
each X is a sigma ligand;
$R^1_2E$ is a divalent group selected from $-R^1_2C-$, $-R^1_2Si-$, $-R^1_2Ge-$, wherein each $R^1$ is independently a hydrogen atom, $C_1$-$C_{20}$ hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2;
$R^2$ and $R^{2'}$, which can be the same or different, are a linear $C_1$-$C_{20}$ hydrocarbyl radical optionally containing one or more heteroatoms from groups 14 to 16 (IUPAC);
Ar and Ar', which can be the same or different, are an aryl or heteroaryl group having up to 20 carbon atoms;
$R^5$ is hydrogen or a $C_1$-$C_{40}$ hydrocarbyl radical optionally containing one or more heteroatoms from groups 14 to 16 (IUPAC);
$R^{5'}$ is a $C_{1-40}$ hydrocarbyl radical optionally containing one or more heteroatoms from groups 14 to 16 (IUPAC);
$R^6$ and $R^{6'}$, which can be the same or different, are a tertiary $C_{4-20}$ hydrocarbyl radical optionally containing one or more heteroatoms from groups 14 to 16 (IUPAC);
(ii) a cocatalyst comprising a first organometallic compound of a Group 13 metal (IUPAC); and
(iii) optionally a second organometallic compound of a Group 13 metal (IUPAC) being different to the first organometallic compound.

It is preferred that $R^2$ and $R^{2'}$, which can be the same or different, are a linear $C_{1-10}$ hydrocarbyl radical optionally containing one or more heteroatoms from groups 14 to 16; Ar and Ar, which can be the same or different, are an aryl or heteroaryl group having up to 20 carbon atoms; $R^5$ is hydrogen or a $C_1$-$C_{20}$ hydrocarbyl radical optionally containing one or more heteroatoms from groups 14 to 16 (IUPAC); $R^{5'}$ is a $C_1$-$C_{20}$ hydrocarbyl radical optionally containing one or more heteroatoms from groups 14 to 16 (IUPAC);
$R^6$ and $R^{6'}$, which can be the same or different, are a tertiary $C_4$-$C_{20}$ hydrocarbyl radical. It is also preferred that $R^1_2E$ is $-R^1_2Si-$, wherein each $R^1$ is independently a $C_1$-$C_{50}$ hydrocarbyl, and n has a value of 1; each $R^2$ and $R^{2'}$ is a methyl radical; $R^5$ is hydrogen or a $C_1$-$C_{10}$ hydrocarbyl radical containing one or more heteroatoms from group 16 (IUPAC); $R^{5'}$ is a $C_1$-$C_{10}$ hydrocarbyl group containing one or more heteroatoms from group 16; each $R^6$ and $R^{6'}$ is a tertiary butyl radical.

It is also preferred that the polymerization temperature in the process for producing the propylene homopolymer (H-PP1) is from 10 to less than 60° C., e.g. from 10 to 55° C., more preferably from 15 to 50° C., still more preferably from 15 to 45° C., yet more preferably from 20 to 40° C. and most preferably from 25 to 35° C.

According to a further aspect of the present invention, a polypropylene blend (PB) is provided, the polypropylene blend (PB) comprises a propylene homopolymer (H-PP1) as defined in the instant invention and a second propylene homopolymer (H-PP2) having a melting temperature $T_m$ at least 5° C. higher, preferably 8° C. higher, even more preferably at least 10° C. higher than the propylene homopolymer (H-PP1).

According to a still further aspect of the present invention, a pipe, film, sheet, fiber, moulded article or extrusion coating is provided, comprising the propylene homopolymer (H-PP1) or the polypropylene blend (PB). It is preferred that the film is a cast, blown or biaxially oriented polypropylene (BOPP) film.

Advantageous embodiments of the present invention are defined in the corresponding sub-claims.

The Propylene Homopolymer (H-PP1)

According to one embodiment of the present invention, the propylene homopolymer (H-PP1) has a)
  a1) a melting temperature $T_m$ lower than 145° C., preferably lower than 142° C., more preferably lower than 140° C.,
  a2) 2,1 regio-defects, more preferably, 2,1 erythro regio-defects, of above 2.0%, preferably above 2.1%, more preferably above 2.2%, determined by $^{13}$C-NMR spectroscopy, and
  a3) a weight average molecular weight $M_w$ of above 100 kg/m, preferably of above 200 kg/mol, more preferably above 300 kg/mol;

or b)
  b1) a melting temperature $T_m$ lower than 145° C., preferably lower than 142° C., more preferably lower than 140° C.,
  b2) 2,1 regio-defects, more preferably, 2,1 erythro regio-defects, of above 2.0%, preferably above 2.1%, more preferably above 2.2%, determined by $^{13}$C-NMR spectroscopy,
  b3) a weight average molecular weight $M_w$ of above 100 kg/m, preferably of above 200 kg/mol, more preferably above 300 kg/mol, and
  b4) a xylene soluble (XS) fraction content of below 2.0 wt.-%, preferably below 1.0 wt.-%, more preferably below 0.5 wt.-%;

or c)
  c1) a melting temperature $T_m$ lower than 145° C., preferably lower than 142° C., more preferably lower than 140° C.,
  c2) 2,1 regio-defects, more preferably, 2,1 erythro regio-defects, of above 2.0%, preferably above 2.1%, more preferably above 2.2%, determined by $^{13}$C-NMR spectroscopy,
  c3) stereo-defects (measured as mrrm pentad content) determined by $^{13}$C-NMR spectroscopy lower than 1.0%, preferably lower than 0.8%, more preferably lower than 0.6%, and c4) a weight average molecular weight $M_w$ of above 100 kg/m, preferably of above 200 kg/mol, more preferably above 300 kg/mol;

or d)

d1) a melting temperature $T_m$ lower than 145° C., preferably lower than 142° C., more preferably lower than 140° C., d2) 2,1 regio-defects, more preferably, 2,1 erythro regio-defects, of above 2.0%, preferably above 2.1%, more preferably above 2.2%, determined by $^{13}$C-NMR spectroscopy, c3) stereo-defects (measured as mrrm pentad content) determined by $^{13}$C-NMR spectroscopy lower than 1.0%, preferably lower than 0.8%, more preferably lower than 0.6%, d4) a weight average molecular weight $M_w$ of above 100 kg/m, preferably of above 200 kg/mol, more preferably above 300 kg/mol, and d5) a xylene soluble (XS) fraction content of below 2.0 wt.-%, preferably below 1.0 wt.-%, more preferably below 0.5 wt.-%.

It should be understood that for the purposes of the present invention, the following terms have the following meaning:

The term "hydrocarbyl" radical in the meaning of the present invention refers preferably to alkyl, alkenyl, alkynyl, cycloalkyl, cycloalkenyl, aryl groups, alkylaryl groups or arylalkyl groups or of course mixtures of these groups such as cycloalkyl substituted by alkyl. Preferred hydrocarbyl radicals are methyl, ethyl, propyl, isopropyl, tert.-butyl, isobutyl, $C_5$-$C_6$ cycloalkyl or cyclohexylmethyl radicals.

The term "$C_1$-$C_{40}$ hydrocarbyl" radical therefore includes $C_1$-$C_{40}$ alkyl, $C_2$-$C_{40}$ alkenyl, $C_2$-$C_{40}$ alkynyl, $C_3$-$C_{40}$ cycloalkyl, $C_3$-$C_{40}$ cycloalkenyl, $C_6$-$C_{40}$ aryl groups, $C_7$-$C_{40}$ alkylaryl groups or $C_7$-$C_{40}$ arylalkyl groups or of course mixtures of these groups such as cycloalkyl substituted by alkyl.

The term "$C_1$-$C_{20}$ hydrocarbyl" radical therefore includes $C_1$-$C_{20}$ alkyl, $C_2$-$C_{20}$ alkenyl, $C_2$-$C_{20}$ alkynyl, $C_3$-$C_{20}$ cycloalkyl, $C_3$-$C_{20}$ cycloalkenyl, $C_6$-$C_{20}$ aryl groups, $C_7$-$C_{20}$ alkylaryl groups or $C_7$-$C_{20}$ arylalkyl groups or of course mixtures of these groups such as cycloalkyl substituted by alkyl.

The term "$C_1$-$C_{10}$ hydrocarbyl" radical therefore includes $C_1$-$C_{10}$ alkyl, $C_2$-$C_{10}$ alkenyl, $C_2$-$C_{10}$ alkynyl, $C_3$-$C_{10}$ cycloalkyl, $C_3$-$C_{10}$ cycloalkenyl, $C_6$-$C_{10}$ aryl groups, $C_7$-$C_{10}$ alkylaryl groups or $C_7$-$C_{10}$ arylalkyl groups or of course mixtures of these groups such as cycloalkyl substituted by alkyl.

The term "$C_1$-$C_5$ hydrocarbyl" radical therefore includes $C_1$-$C_5$ alkyl, $C_2$-$C_5$ alkenyl, $C_2$-$C_5$ alkynyl, $C_3$-$C_5$ cycloalkyl, $C_3$-$C_5$ cycloalkenyl or of course mixtures of these groups such as cycloalkyl substituted by alkyl.

The term "aryl" means a preferably monocyclic aromatic ring structure. Preferably, the aryl group is a phenyl group.

The term "heteroaryl" means a preferably monocyclic aromatic ring structure comprising at least one heteroatom. Preferred heteroaryl groups have 1 to 4 heteroatoms selected from O, S and N. Preferred heteroaryl groups include furanyl, thiophenyl, oxazole, thiazole, isothiazole, isooxazole, triazole and pyridyl.

Any group including "one or more heteroatoms from groups 14 to 16 (IUPAC)" preferably means Si, O, S or N. N groups may present as —NH— or —NR"— where R" is $C_1$-$C_{10}$ alkyl. In one embodiment of the present invention, the one or more heteroatoms from groups 14 to 16 (IUPAC) is a heteroatom from group 16, preferably O. There may, for example, be 1 to 4 heteroatoms.

The term "2,1 regio defects" defines the sum of 2,1 erythro regio-defects and 2,1 threo regio-defects.

The term "regio defects" defines the sum of 2,1 erythro regio-defects, 2,1 threo regio-defects and 3,1 regio-defects.

Wherever in the instant invention the amount of defects, i.e. regio defects, like 2,1 regio defects, i.e. 2,1 erythro regio-defects, 2,1 threo regio-defects and 3,1 regio-defects, and stereo-defects, are indicated by "%" the average percentage of propylene units in the polymer chain is meant.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

In the following, it is referred to further details of the present invention.

It is important to note that there exists a crucial difference in the chain-microstructure between polypropylenes produced by a metallocene catalyst and a Ziegler-Natta catalyst. The polymer chains of metallocene-made polypropylene may contain either stereo- or regio-defects, or both, whereas the chains of Ziegler-Natta based polypropylenes has only stereo defects. As the propylene homopolymer according to this invention is produced by a metallocene catalyst it has preferably a high amount of 2,1 regio-defects, for example a high amount of 2,1-erythro regio-defects.

Thus, the present invention relates to novel propylene homopolymers (H-PP1) which have high amounts of 2,1-regio-defects, especially high 2,1-erythro regio-defects, low melting temperatures and high molecular weight. These polymers can be obtained by polymerisation of propylene at a temperature and in the presence of certain catalysts as described in detail herein.

In particular, the invention relates to a polypropylene homopolymer (H-PP1) having a) a melting temperature $T_m$ of less than 145° C., b) 2,1-regio-defects, preferably 2,1 erythro regio-defects, of above 2.0% determined by $^{13}$C-NMR spectroscopy, and c) a weight average molecular weight $M_w$ of above 100 kg/mol.

Accordingly, the propylene homopolymer (H-PP1) can be defined by the melting temperature ($T_m$). Thus, it is appreciated that the propylene homopolymer (H-PP1) of the instant invention has a melting temperature ($T_m$) measured by differential scanning calorimetry (DSC) of below 145 C. In one embodiment of the present invention, the propylene homopolymer (H-PP1) of the instant invention has a melting temperature ($T_m$) measured by differential scanning calorimetry (DSC) of less than 143° C., preferably of less than 140° C., more preferably in the range of from 120 to 143° C., still more preferably in the range of 120 to 142.5° C., still yet more preferably in the range of 120 to 140° C., like in the range of 120 to 138° C. For example, the propylene homopolymer (H-PP1) of the instant invention has a melting temperature ($T_m$) measured by differential scanning calorimetry (DSC) in the range of from 130 to 142.5° C. or 130 to 140° C.

Additionally, the inventive propylene homopolymer (H-PP1) is featured by a rather high concentration of 2,1 regio-defects, like 2,1-erythro regio-defects, compared to known metallocene based polypropylenes. In one embodiment of the present invention, it is preferred that the propylene homopolymer (H-PP1) of the instant invention has 2,1 regio-defects, like 2,1 erythro regio-defects, of above 2.0%, preferably of above 2.1%, more preferably of above 2.2%, yet more preferably from 2.0 to 5.0%, still more preferably from 2.1 to 4.5%, still yet more preferably from 2.2 to 4.0%, like 2.5 to 3.8%, determined by $^{13}$C-NMR spectroscopy. For example, the propylene homopolymer (H-PP1) of the instant invention has 2,1 regio-defects, like 2,1 erythro regio-defects, of from 2.0 to 3.5%, like 2.2 to 3.5%, determined by $^{13}$C-NMR spectroscopy. In one embodiment the amount of 2,1 regio-defects and 2,1 erythro regio-defects are the same and specified as indicated in this paragraph.

It is further appreciated that the propylene homopolymer (H-PP1) of the instant invention has a rather low amount of 3,1 regio-defects, i.e. equal or less than 0.6%, more preferably equal or less than 0.5%, still more preferably equal or less than 0.4%, as determined by $^{13}$C-NMR spectroscopy.

Accordingly, the propylene homopolymer (H-PP1) of the instant invention can be additionally or alternatively defined by its total amount of regio defects, i.e. by its sum of 2,1 erythro regio-defects, 2,1 threo regio-defects and 3,1 regio-defects. In one embodiment of the present invention, the propylene homopolymer (H-PP1) has a total amount of regio defects of above 2.0%, preferably of above 2.1%, more preferably of above 2.2%, yet more preferably from 2.0 to 5.0%, still more preferably from 2.1 to 4.5%, still yet more preferably from 2.2 to 4.0%, like 2.5 to 3.8%, determined by $^{13}$C-NMR spectroscopy.

The propylene homopolymer (H-PP1) of the instant invention can, additionally to the regio-defects, like the 2,1 regio-defects, also be defined by its stereoregularity, i.e. by its isotacticity. Thus, it is preferred that the propylene homopolymer (H-PP1) has a rather low mrrm pentad content (stereo-defects), i.e. equal or lower than 1.0%, more preferably equal or lower than 0.8%, still more preferably equal or lower than 0.6%, determined by $^{13}$C-NMR spectroscopy.

Thus, additionally or alternatively, the propylene homopolymer (H-PP1) of the instant invention can be defined by its total amount of defects in the polymer chain, i.e. by its sum of 2,1 erythro regio-defects, 2,1 threo regio-defects, 3,1 region-defects and mrrm pentad content. In one embodiment of the present invention, the propylene homopolymer (H-PP1) has a total amount of defects of above 2.0%, preferably of above 2.1%, more preferably of above 2.2%, yet more preferably from 2.0 to 5.0%, still more preferably from 2.1 to 4.5%, still yet more preferably from 2.2 to 4.0%, like 2.5 to 3.8%, determined by $^{13}$C-NMR spectroscopy.

A further requirement of the propylene homopolymer (H-PP1) of the instant invention is that the propylene homopolymer (H-PP1) has a high weight average molecular weight $M_w$. In particular, the propylene homopolymer (H-PP1) of the instant invention has a weight average molecular weight $M_w$ of above 100 kg/mol. In one embodiment of the present invention, the propylene homopolymer (H-PP1) has weight average molecular weight $M_w$ of above 200 kg/mol, preferably of above 300 kg/mol, like of above 1,000 kg/mol, and most preferably of from 100 to 2,000 kg/mol. For example, the propylene homopolymer (H-PP1) of the instant invention has weight average molecular weight $M_w$ of from 100 to 2,000 kg/mol, preferably from 200 to 1,500 kg/mol, more preferably from 300 to 1,500 kg/mol.

The number average molecular weight ($M_n$) of the propylene homopolymer (H-PP1) is preferably in the range of 50 to 1,000 kg/mol, more preferably from 60 to 700 kg/mol.

A broad molecular weight distribution (MWD) improves the processability of the polypropylene. Accordingly, it is appreciated that the polydispersity index (Mw/Mn) of the propylene homopolymer (H-PP1) is at least 2.0, preferably at least 2.2 and most preferably at least 2.4. On the other hand the molecular weight distribution (MWD) should be not too broad. Therefore, it is preferred that the molecular weight distribution (MWD) of the propylene homopolymer (H-PP1) is less than 30.0, preferably less than 25.0 and most preferably less than 20.0. For example, the molecular weight distribution (MWD) of the propylene homopolymer (H-PP1) is from 2.0 to 30.0, preferably from 2.2 to 25.0 and most preferably from 2.4 to 20.0.

Additionally or alternatively, the propylene homopolymer (H-PP1) of the instant invention is featured by rather low content of the xylene soluble fraction (XS), i.e. by a xylene soluble fraction (XS) content of equal or below 2.0 wt.-%, more preferably of equal or below 1.5 wt.-%, yet more preferably equal or below 1.0 wt.-%, like equal or below 0.5 wt.-% based on the total weight of the propylene homopolymer (H-PP1). For example, the propylene homopolymer (H-PP1) of the instant invention has a xylene soluble fraction (XS) content in the range of from 0.05 to 2.0 wt.-%, more preferably in the range of from 0.1 to 1.5 wt.-%, yet more preferably in the range of from 0.1 to 1.0 wt.-%, like in the range of from 0.1 to 0.5 wt.-%, based on the total weight of the propylene homopolymer (H-PP1).

Additionally or alternatively, the propylene homopolymer (H-PP1) of the instant invention is featured by a rather low tensile modulus and a rather high tensile strain at break. The tensile modulus is preferably of equal or below 1500 MPa, more preferable of equal or below 1300 MPa, still more preferably of equal or below 1200 MPa. For example the propylene homopolymer (H-PP1) of the instant invention has a tensile modulus in the range from 800 to 1500 MPa, more preferably in the range from 900 to 1300 MPa, yet more preferably in the range from 1000 to 1200 MPa, like in the range from 1100 to 1180 MPa. The tensile strain at break is preferably equal or higher than 150%, more preferably higher than 250%, yet more preferable higher than 400%. For example the propylene homopolymer (H-PP1) of the instant invention has a tensile strain at break in the range from 150 to 800°, more preferably in the range of 250 to 750%, yet more preferably in the range of 350 to 700%, like in the range from 400 to 650%. A propylene homopolymer featured by a rather low tensile modulus and a rather high tensile strain at break, e.g. the propylene homopolymer (H-PP1) of the instant invention, represents a rather soft material which is advantageous for various applications.

The propylene homopolymer (H-PP1) of the instant invention does not define a composition of different polymers. Accordingly, the propylene homopolymer may comprise further additives but no other polymer components than the propylene homopolymer.

It is appreciated that the propylene homopolymer (H-PP1) of the instant invention may comprise standard polymer additives well known in the art. For example, the propylene homopolymer (H-PP1) comprises additives selected from the group consisting of UV stabilisers, antioxidants, pigments, fillers and the like.

In one embodiment of the present invention, the propylene homopolymer (H-PP1) of the instant invention is nucleated, i.e. α-nucleated.

Nucleation increases the crystallization temperature significantly, e.g. by up to 10° C. Accordingly, a propylene homopolymer (H-PP1) having low melting temperature $T_m$ but high crystallisation temperature $T_c$ can be formed. The increase in melting temperature $T_m$ is much less, around 2° C. Thus, melting temperature $T_m$ of nucleated propylene homopolymer (H-PP1) may be a bit higher than corresponding non-nucleated propylene homopolymer (H-PP1). The melting temperature $T_m$ of the propylene homopolymer (H-PP1) of the instant invention is thus preferably determined in the absence of a nucleating agent, like an α-nucleating agent, if not otherwise indicated.

In one embodiment of the present invention, the propylene homopolymer (H-PP1) being nucleated, like α-nucleated, has a melting temperature $T_m$ of less than 150° C., preferably less than 145° C.

Preferably, the mrrm pentad content of such a nucleated, like α-nucleated, propylene homopolymer (H-PP1) is less than 0.5%, more preferably of less than 0.3% and most preferably of less than 0.2%, determined by $^{13}$C-NMR spectroscopy.

In one embodiment of the present invention, a nucleation, i.e. α-nucleation, of the propylene homopolymer (H-PP1) is preferred. This may also improve gloss and transparency. Suitable α-nucleating agents are those commonly used in the art and listed for example in chapter 2 of the review by Gahleitner et al. in International Polymer Processing 26 (2011) p. 2-20.

Especially suitable are inorganic α-nucleating agents such as talc. Talc can be added in an amount of 0.05 to 30.00 wt.-%, based on the total weight of the propylene homopolymer (H-PP1). Other nucleating agents are organic particulate α-nucleating agents such as carboxylic or phosphoric acid salts with a substituted or un-substituted aromatic ring. These can be added in an amount of 0.01 to 1.0 wt.-%, based on the total weight of the propylene homopolymer (H-PP1). Other α-nucleating agents are polymeric nucleating agents such as poly(tetrafluoro ethylene) or isotactic poly(vinyl cyclohexane). These can be added in an amount of 0.001 to 0.20 wt.-%, based on the total weight of the propylene homopolymer (H-PP1). Other α-nucleating agents are soluble organic nucleating agents such as sorbitol derivatives, nonitol derivatives or aliphatic substituted trisamides. These can be added in an amount of 0.05 to 1.0 wt.-%, based on the total weight of the propylene homopolymer (H-PP1).

Typical examples for suitable organic particulate α-nucleating agents are sodium benzoate, sodium 2,2'-methylene-bis-(4,6-di-tert-butylphenyl) phosphate (CAS No. 85209-91-2, trade name Adekastab NA-11, commercially available from Adeka Palmarole, France), a mixture consisting of 60 wt.-% Hydroxybis (2,4,8,10-tetra-tert. butyl-6-hydroxy-12H-dibenzo(d,g)(1,3,2) dioxaphosphocin 6-oxidato) aluminium (CAS No. 151841-65-5) and 40 wt.-% Li-myristate (CAS No. 20336-96-3) (trade name Adekastab NA-21, commercially available from Adeka Palmarole, France), the disodium salt of Cis-endo-bicyclo[2.2.1]heptane-2,3-dicarboxylic acid (CAS No. 351870-33-2; trade name Hyperform HPN-68, commercially available from Milliken Inc., USA). A typical examples for suitable polymeric nucleating agents is isotactic poly(vinyl cyclohexane) (CAS No. 25498-06-0).

Typical examples for suitable soluble organic α-nucleating agents are 1,3:2,4-Bis(3,4-dimethylbenzylidene)sorbitol (CAS No. 135861-56-2; trade name Millad 3988, commercially available from Milliken Inc., USA), 1,2,3-trideoxy-4, 6:5,7-bis-0[(4-propylphenyl)methylene]-nonitol (CAS No. 882073-43-0; trade name Millad NX8000, commercially available from Miliken Inc., USA) and N,N',N"-tris-tert-Butyl-1,3,5-benzenetricarboxamide (CAS No. 745070-61-5; trade name Irgaclear XT386, commercially available from BASF AG, Germany).

In one embodiment of the present invention, the propylene homopolymer (H-PP1) is free of nucleating agents, in particular free of β-nucleating agents and/or α-nucleating agents. In another embodiment the propylene homopolymer (H-PP1) is free of β-nucleating agents but contains α-nucleating agents.

The propylene homopolymer (H-PP1) of the instant invention is obtainable, preferably obtained, by a process for the preparation of a propylene homopolymer (H-PP1) in the presence of specific catalysts as described in detail below.

The Second Propylene Homopolymer (H-PP2)

As mentioned above the present invention is additionally directed to a polypropylene blend (PB) which contains in addition to the propylene homopolymer (H-PP1) a second propylene homopolymer (H-PP2). The second propylene homopolymer (H-PP2) can be any propylene homopolymer as long as it has a higher melting temperature compared to the propylene homopolymer (H-PP1). Accordingly the second propylene homopolymer (H-PP2) has a melting temperature $T_m$ at least 5° C. higher, preferably 8° C. higher, even more preferably at least 10° C. higher than the propylene homopolymer (H-PP1) used in the instant polypropylene blend (PB).

Accordingly, the second propylene homopolymer (H-PP2) has a melting temperature ($T_m$) measured by differential scanning calorimetry (DSC) of at least 140 C. In one embodiment of the present invention, the second propylene homopolymer (H-PP2) has a melting temperature ($T_m$) of at least 143° C., preferably of at least 145° C., more preferably in the range of from 140 to 168° C., yet more preferably in the range of from 143 to 165° C., still more preferably in the range of from 145 to 163° C., like in the range of 150 to 163° C.

Additionally, the second propylene homopolymer (H-PP2) is featured by a rather low concentration of 2,1 regio-defects, like 2,1-erythro regio-defects, compared to the propylene homopolymer (H-PP1). Thus it is appreciated that the second propylene homopolymer (H-PP2) has 2,1 regio-defects, like 2,1 erythro regio-defects, being at least 0.8% lower, more preferably 0.9%, yet more preferably 1.0% lower, than the 2,1 regio-defects, like 2,1-erythro regio-defects, of the propylene homopolymer (H-PP1). In one preferred embodiment the second propylene homopolymer (H-PP2) has 2,1 regio-defects, like 2,1-erythro regio-defects, equal or below 1.8%, more preferably of equal or below 1.6%, still more preferably equal or below 1.4%. For example, the second propylene homopolymer (H-PP2) has 2,1 regio-defects, like 2,1 erythro regio-defects, of from 1.1 to equal or below 1.8%, like of from 1.1 to equal or below 1.6%.

The second propylene homopolymer (H-PP2) can be additionally or alternatively defined by its total amount of regio defects, i.e. by its sum of 2,1 erythro regio-defects, 2,1 threo regio-defects and 3,1 regio-defects. In one embodiment of the present invention, the second propylene homopolymer (H-PP2) has a total amount of regio defects of equal or below 1.8%, more preferably of equal or below 1.6%, still more preferably equal or below 1.4%, yet more preferably of from 1.1 to equal or below 1.8%, like of from 1.1 to equal or below 1.6%.

Further it is appreciated that the polydispersity index (Mw/Mn) of the second propylene homopolymer (H-PP2) is at least 2.0, more preferably at least 2.2, still more preferably from 2.0 to 30.0, yet more preferably from 2.2 to 25.0.

The preparation of the second propylene homopolymer (H-PP2) is in the skilled knowledge. For instance the second propylene homopolymer (H-PP2) can be produced in the presence of a Ziegler-Natta catalyst or a metallocene catalyst.

The Polypropylene Blend (PB)

A further aspect of the instant invention is a polypropylene blend (PB) comprising the propylene homopolymer (H-PP1) and the second propylene homopolmyer (H-PP2). Preferably the polypropylene blend (PB) contains as polymer component only the propylene homopolymer (H-PP1) and the second propylene homopolmyer (H-PP2). Accordingly the polypropylene blend (PB) may contain additives in an amount up to 10 wt.-%, more preferably up to 5 wt.-%, based on the total amount of the polypropylene blend (PB). Preferably the weight ratio between the propylene homopolymer (H-PP1) and the second propylene homopolmyer (H-PP2) is 90/10 to 10/90, more preferably 80/20 to 20/80, yet more preferably from 70/30 to 30/70.

Preferably, the polypropylene blend (PB) has a melting temperature $(T_m)$ in the range of from 135 to 160° C., more preferably in the range of from 140 to 155° C.

The polypropylene comprising the two propylene homopolymers (H-PP1) and (H-PP2) shows a broader melting range compared to its individual fractions, and thus broadens the processability window in e.g. film manufacturing.

Additionally, the polypropylene blend (PB) preferably is featured by 2,1 regio-defects, like 2,1 erythro regio-defects, from 0.1 to 4.7%, more preferably from 0.5 to 4.0.5%, like in the range of 1.0 to 3.0%.

The polypropylene blend (PB) can be additionally or alternatively defined by its total amount of regio defects, i.e. by its sum of 2,1 erythro regio-defects, 2,1 threo regio-defects and 3,1 regio-defects. In one embodiment the polypropylene blend (PB) has a total amount of regio defects from 0.1 to 4.7%, more preferably from 0.5 to 4.0.5%, like in the range of 1.0 to 3.0%.

Preferably the polypropylene blend (PB) has a weight average molecular weight $M_w$ of above 50 kg/mol, more preferably of above 100 kg/mol, still more preferably of from 50 to 2,000 kg/mol, still yet more preferably of from 100 to 1,500 kg/mol, like from 300 to 1,500 kg/mol.

Further it is appreciated that the polydispersity index (Mw/Mn) of the polypropylene blend (PB) is at least 2.0, more preferably at least 2.2, still more preferably from 2.0 to 30.0, yet more preferably from 2.2 to 25.0.

The preparation of the polypropylene blend (PB) is in the skilled knowledge. For instance the polypropylene blend (PB) can be obtained by mixing the propylene homopolymer (H-PP1) with the second propylene homopolymer (H-PP2) in an extruder or by producing the polypropylene blend (PB) in a sequential polymerization process as known by the skilled person.

Preparation the Propylene Homopolymer (H-PP1)

The Solid Catalyst System

The propylene homopolymer (H-PP1) of this invention has been preferably prepared in the presence of a metallocene catalyst, like a metallocene catalyst of formula (I). Accordingly, the process for the preparation of the instant propylene homopolymer (H-PP1) comprises the step of polymerizing propylene in the presence of a solid catalyst system, said solid catalyst system comprises (i) a complex of formula (I)

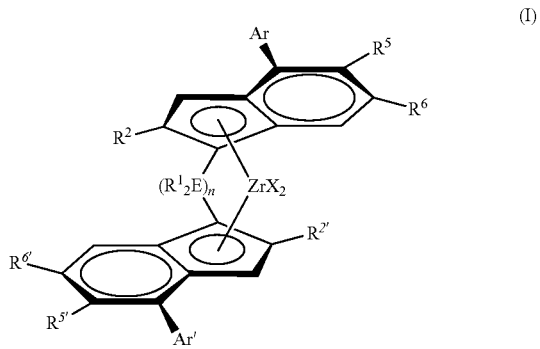

wherein each X is a sigma ligand;

$R^1{}_2E$ is a divalent group selected from $—R^1{}_2C—$, $—R^1{}_2Si—$, $—R^1{}_2Ge—$, wherein each $R^1$ is independently a hydrogen atom, $C_{1-20}$-hydrocarbyl, tri($C_{1-20}$-alkyl)silyl, $C_{6-20}$-aryl, $C_{7-20}$-arylalkyl or $C_{7-20}$-alkylaryl, and n has a value from 1 to 2;

$R^2$ and $R^{2'}$, which can be the same or different, are a linear $C_{1-20}$ hydrocarbyl radical optionally containing one or more heteroatoms from groups 14 to 16 (IUPAC);

Ar and Ar', which can be the same or different, are an aryl or heteroaryl group having up to 20 carbon atoms;

$R^5$ is hydrogen or a $C_{1-40}$ hydrocarbyl radical optionally containing one or more heteroatoms from groups 14 to 16 (IUPAC);

$R^{5'}$ is a $C_{1-40}$ hydrocarbyl radical optionally containing one or more heteroatoms from groups 14 to 16 (IUPAC);

$R^6$ and $R^{6'}$, which can be the same or different, are a branched $C_{3-20}$ hydrocarbyl radical;

(ii) a cocatalyst comprising a first organometallic compound of a Group 13 metal (IUPAC); and (iii) optionally a second organometallic compound of a Group 13 metal (IUPAC) being different to the first organometallic compound.

In one embodiment of the present invention, the substituents of the two multicyclic ligands making up the complex of formula (I) are identical.

Alternatively, it is preferred that the substituents of the two multicyclic ligands making up the complex of formula (I) are different. For example, it is preferred that at least one substituent on one multicyclic ligand differs from the corresponding substituent on the other multicyclic ligand. For example, one substituent on one multicyclic ligand differs from the corresponding substituent on the other multicyclic ligand. Alternatively, two substituents on one multicyclic ligand differ from the corresponding substituents on the other multicyclic ligand.

In one embodiment of the present invention, it is appreciated that substituent $R^5$ on one multicyclic ligand differs from the corresponding $R^{5'}$ substituent on the other multicyclic ligand. Additionally or alternatively, it is appreciated that substituent Ar on one multicyclic ligand differs from the corresponding Ar substituent on the other multicyclic ligand.

In one embodiment of the present invention, substituents $R^5$ and Ar on one multicyclic ligand differ from the corresponding $R^{5'}$ and Ar substituents on the other multicyclic ligand.

Preferably, the metallocene catalysts of the present invention are in their racemic (rac) or racemic-anti-form.

For the purpose of the present invention the term "racemic (rac) form" means that the like substituents of the two multicyclic ligands are on opposite sides with respect to the plane containing the zirconium and the centre of the cyclopentadienyl ring of the ligands, "anti-racemic form" means that the bulkier substituents of the two multicyclic ligands on the metallocene compound are on opposite sides with respect to the plane containing the zirconium and the centre of the cyclopentadienyl ring of said multicyclic ligands, as described for example in EP 1 117 334.4.

In one embodiment of the present invention, each X, which may be the same or different, is a hydrogen atom, a halogen atom, a R, OR, $OSO_2CF_3$, OCOR, SR, $NR_2$ or $PR_2$ radical wherein R is a linear or branched, cyclic or acyclic, $C_1$-$C_{40}$ alkyl, $C_2$-$C_{40}$ alkenyl, $C_2$-$C_{40}$ alkynyl, $C_6$-$C_{40}$ aryl, $C_7$-$C_{40}$ alkylaryl or $C_7$-$C_{40}$ arylalkyl radical; optionally containing one or more heteroatoms from groups 14 to 16. For example, each X, which may be the same or different, is a hydrogen atom, a halogen atom, a R, OR, $OSO_2CF_3$, OCOR, SR, $NR_2$ or $PR_2$ group wherein R is a linear or branched, cyclic or acyclic, $C_1$-$C_{20}$ alkyl, $C_2$-$C_{20}$ alkenyl, $C_2$-$C_{20}$ alkynyl, $C_6$-$C_{20}$ aryl, $C_7$-$C_{20}$ alkylaryl or $C_7$-$C_{20}$ arylalkyl radical; optionally containing one or more heteroatoms from groups 14 to 16 (IUPAC). For example, R is preferably a $C_1$-$C_6$ alkyl, phenyl or benzyl group.

In one embodiment of the present invention, each X, which are the same, is a hydrogen atom, a halogen atom, a R, OR, $OSO_2CF_3$, OCOR, SR, $NR_2$ or $PR_2$ radical wherein R is a linear or branched, cyclic or acyclic, $C_1$-$C_{40}$ alkyl, $C_2$-$C_{40}$ alkenyl, $C_2$-$C_{40}$ alkynyl, $C_6$-$C_{40}$ aryl, $C_7$-$C_{40}$ alkylaryl or $C_7$-$C_{40}$ arylalkyl radical; optionally containing one or more heteroatoms from groups 14 to 16 (IUPAC). For example, R is preferably a $C_1$-$C_6$ alkyl, phenyl or benzyl radical.

In one embodiment of the present invention, each X is independently a hydrogen atom, a halogen atom, $C_1$-$C_6$ alkoxy group or an R group, e.g. preferably a $C_1$-$C_6$ alkyl, phenyl or benzyl group. Most preferably X is chlorine or a methyl radical. Preferably each X radical is the same. For example, both X radicals, which are the same, are methyl.

$R^1_2E$ is a divalent bridge selected from —$R^1_2C$—, —$R^1_2Si$—, —$R^1_2Ge$—, wherein each $R^1$ is independently a hydrogen atom, $C_{1-20}$ hydrocarbyl, tri($C_1$-$C_{20}$-alkyl)silyl, $C_6$-$C_{20}$ aryl, $C_7$-$C_{20}$ arylalkyl or $C_7$-$C_{20}$ alkylaryl, and n has a value from 1 to 2.

In one embodiment of the present invention, $R^1_2E$ is a divalent group selected from —$R^1_2C$—, —$R^1_2Si$—, wherein each $R^1$ is independently a hydrogen atom, $C_{1-20}$-hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2. For example, $R^1_2E$ is —$R^1_2Si$—, wherein each $R^1$ is independently a hydrogen atom, $C_1$-$C_{20}$ hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2.

In one embodiment of the present invention, $R^1_2E$ is —$R^1_2Si$—, wherein each $R^1$ is independently a hydrogen atom, $C_1$-$C_{20}$ hydrocarbyl, tri($C_1$-$C_{20}$-alkyl)silyl, $C_6$-$C_{20}$ aryl, $C_7$-$C_{20}$ arylalkyl or $C_7$-$C_{20}$ alkylaryl, and n has a value of 1. For example, $R^1_2E$ is —$R^1_2Si$—, wherein each $R^1$ is independently a $C_{1-20}$-hydrocarbyl and n has a value of 1 or $R^1_2E$ is —$R^1_2Si$—, wherein each $R^1$ is independently a $C_1$-$C_{10}$ hydrocarbyl and n has a value of 1. In one embodiment of the present invention, $R^1_2E$ is —$R^1_2Si$—, wherein each $R^1$ is independently a $C_1$-$C_5$ hydrocarbyl and n has a value of 1. Preferably, each $R^1$ is a $C_1$-hydrocarbyl and n has a value of 1.

$R^2$ and $R^{2'}$, which can be the same or different, are a linear $C_1$-$C_{20}$ hydrocarbyl radical optionally containing one or more heteroatoms from groups 14 to 16 (IUPAC).

In one embodiment of the present invention, $R^2$ and $R^{2'}$, which can be the same or different, are a linear $C_{1-10}$ hydrocarbyl radical optionally containing one or more heteroatoms from groups 14 to 16 (IUPAC). Alternatively, $R^2$ and $R^{2'}$, which can be the same or different, are a linear $C_1$-$C_5$ hydrocarbyl radical optionally containing one or more heteroatoms from groups 14 to 16 (IUPAC).

In one embodiment of the present invention, $R^2$ and $R^{2'}$, which can be the same or different, are a linear $C_1$-$C_5$ hydrocarbyl radical. For example, each $R^2$ and $R^{2'}$, which are the same, is a linear $C_1$-$C_5$ hydrocarbyl radical. Preferably, each $R^2$ and $R^{2'}$, which are the same, is a methyl or ethyl radical.

In one embodiment of the present invention, each $R^2$ and $R^{2'}$ is a methyl radical.

Ar and Ar', which can be the same or different, are an aryl or heteroaryl group having up to 20 carbon atoms.

In one embodiment of the present invention, the Ar and Ar groups are different.

The Ar group is preferably a $C_6$-$C_{20}$ aryl group such as a phenyl group. In one embodiment of the present invention, the Ar group is an unsubstituted $C_6$-$C_{20}$ aryl group, preferably an unsubstituted phenyl group. Alternatively, the Ar group is a substituted $C_6$-$C_{20}$ aryl group, preferably a phenyl based group substituted by groups $R^1$, preferably by one $R^1$ group in position 4, i.e. located para to the bond to the indenyl group, i.e. the multicyclic ligand.

The Ar group is preferably a $C_6$-$C_{20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups $R^1$, more preferably by one or two $R^1$ groups, especially in position 4 of the aryl ring bound to the indenyl ligand, i.e. located para to the bond to the indenyl group, i.e. the multicyclic ligand.

In one embodiment of the present invention, both Ar and Ar' are unsubstituted. In another embodiment of the present invention, Ar is unsubstituted and Ar is substituted by one or two groups $R^1$, preferably by one $R^1$ group in position 4, i.e. located para to the bond to the indenyl group. Preferably, $R^1$ is a $C_1$-$C_{20}$ hydrocarbyl and preferably a $C_1$-$C_{10}$ hydrocarbyl, such as a $C_1$-$C_{10}$ alkyl radical. For example, $R^1$ is a $C_2$-$C_{10}$ alkyl group such as $C_3$-$C_8$ alkyl group. In one embodiment of the present invention, $R^1$ is a bulky group, i.e. is branched. The branching may be alpha or beta to the aryl or heteroaryl group. Preferably, $R^1$ is a branched $C_3$-$C_8$ alkyl group. For example, $R^1$ is a tert.-butyl or isopropyl group.

$R^5$ is hydrogen or a $C_{1-40}$ hydrocarbyl radical optionally containing one or more heteroatoms from groups 14 to 16 (IUPAC).

In one embodiment of the present invention, $R^5$ is hydrogen or a $C_{1-20}$ hydrocarbyl radical optionally containing one or more heteroatoms from groups 14 to 16 (IUPAC) and preferably $R^5$ is hydrogen or a $C_1$-$C_{10}$ hydrocarbyl radical optionally containing one or more heteroatoms from groups 14 to 16 (IUPAC). For example, $R^5$ is hydrogen or a $C_1$-$C_{10}$ hydrocarbyl radical containing one or more heteroatoms from groups 14 to 16 (IUPAC).

In one embodiment of the present invention, $R^5$ is hydrogen or a $C_1$-$C_{10}$ hydrocarbyl radical optionally containing one or more heteroatoms from group 16 (IUPAC). For example, $R^5$ is hydrogen or a $C_1$-$C_{10}$ hydrocarbyl radical containing one or more heteroatoms from group 16 (IUPAC).

It is preferred that $R^5$ is hydrogen or a $C_1$-$C_5$ hydrocarbyl radical optionally containing one or more oxygen, preferably one oxygen. For example, $R^5$ is hydrogen or a $C_1$-$C_5$ hydrocarbyl radical containing one or more oxygen, preferably one oxygen. It is preferred that $R^5$ is hydrogen, methoxy, ethoxy or isopropoxy. In one embodiment of the present invention, $R^5$ is hydrogen or methoxy.

In particular, $R^{5'}$ is a $C_1$-$C_{20}$ hydrocarbyl radical optionally containing one or more heteroatoms from groups 14 to 16 and preferably $R^{5'}$ is a $C_1$-$C_{10}$ hydrocarbyl radical optionally containing one or more heteroatoms from groups 14 to 16 (IUPAC). For example, $R^{5'}$ is a $C_1$-$C_{10}$ hydrocarbyl radical containing one or more heteroatoms from groups 14 to 16 (IUPAC).

In one embodiment of the present invention, $R^{5'}$ is a $C_1$-$C_{10}$ hydrocarbyl radical optionally containing one or more heteroatoms from group 16 (IUPAC). For example, $R^{5'}$ is a $C_1$-$C_{10}$ hydrocarbyl radical containing one or more heteroatoms from group 16 (IUPAC).

It is preferred that $R^{5'}$ is a $C_1$-$C_5$ hydrocarbyl radical optionally containing one or more oxygen, preferably one oxygen. For example, $R^{5'}$ is a $C_1$-$C_5$ hydrocarbyl radical containing one or more oxygen, preferably one oxygen. It is preferred that $R^{5'}$ is methoxy, ethoxy or isopropoxy. In one embodiment of the present invention, $R^{5'}$ is methoxy.

It is appreciated that $R^5$ and $R^{5'}$ may be the same or different.

In one embodiment of the present invention, $R^5$ and $R^{5'}$ are the same. In case $R^5$ and $R^{5'}$ are the same, it is appreciated that each of $R^5$ and $R^{5'}$ is a $C_1$-$C_{40}$ hydrocarbyl radical optionally containing one or more heteroatoms from groups 14 to 16 (IUPAC), preferably a $C_1$-$C_{20}$ hydrocarbyl radical optionally containing one or more heteroatoms from groups 14 to 16 (IUPAC) and most preferably a $C_1$-$C_{10}$ hydrocarbyl radical optionally containing one or more heteroatoms from groups 14 to 16 (IUPAC).

It is preferred that each of $R^5$ and $R^{5'}$ is a $C_1$-$C_{10}$ hydrocarbyl radical containing one or more heteroatoms from groups 14 to 16 (IUPAC), preferably a $C_1$-$C_{10}$ hydrocarbyl radical optionally containing one or more heteroatoms from groups 14 to 16 (IUPAC) and most preferably a $C_1$-$C_{10}$ hydrocarbyl radical optionally containing one or more heteroatoms from groups 14 to 16 (IUPAC). For example, each of $R^5$ and $R^{5'}$ is a $C_1$-$C_{10}$ hydrocarbyl radical containing one or more heteroatoms from groups 14 to 16 (IUPAC).

In one embodiment of the present invention, each of $R^5$ and $R^{5'}$ is a $C_1$-$C_{10}$ hydrocarbyl radical optionally containing one or more heteroatoms from group 16. For example, each of $R^5$ and $R^{5'}$ is a $C_1$-$C_{10}$ hydrocarbyl radical containing one or more heteroatoms from group 16 (IUPAC).

It is preferred that each of $R^5$ and $R^{5'}$ is a $C_1$-$C_5$ hydrocarbyl radical optionally containing one or more oxygen, preferably one oxygen. For example, each of $R^5$ and $R^{5'}$ is a $C_1$-$C_5$ hydrocarbyl radical containing one or more oxygen, preferably one oxygen. It is preferred that each of $R^5$ and $R^{5'}$ is methoxy, ethoxy or isopropoxy. In one embodiment of the present invention, each of $R^5$ and $R^{5'}$ is methoxy.

Alternatively, $R^5$ and $R^{5'}$ are different. In case $R^5$ and $R^{5'}$ are different, it is appreciated that $R^5$ is hydrogen and $R^{5'}$ is a $C_1$-$C_{40}$ hydrocarbyl radical optionally containing one or more heteroatoms from groups 14 to 16 (IUPAC), preferably a $C_1$-$C_{20}$ hydrocarbyl radical optionally containing one or more heteroatoms from groups 14 to 16 (IUPAC) and most preferably a $C_1$-$C_{10}$ hydrocarbyl radical optionally containing one or more heteroatoms from groups 14 to 16 (IUPAC).

It is preferred that $R^5$ is hydrogen and $R^{5'}$ is a $C_1$-$C_{40}$ hydrocarbyl radical optionally containing one or more heteroatoms from groups 14 to 16 (IUPAC), preferably a $C_1$-$C_{20}$ hydrocarbyl radical optionally containing one or more heteroatoms from groups 14 to 16 (IUPAC) and most preferably a $C_1$-$C_{10}$ hydrocarbyl radical optionally containing one or more heteroatoms from groups 14 to 16 (IUPAC). For example, $R^5$ is hydrogen and $R^{5'}$ is a $C_{1-10}$ hydrocarbyl radical containing one or more heteroatoms from groups 14 to 16 (IUPAC).

In one embodiment of the present invention, $R^5$ is hydrogen and $R^{5'}$ is a $C_1$-$C_{10}$ hydrocarbyl radical optionally containing one or more heteroatoms from group 16 (IUPAC). For example, $R^5$ is hydrogen and $R^{5'}$ is a $C_1$-$C_{10}$ hydrocarbyl radical containing one or more heteroatoms from group 16 (IUPAC).

It is preferred that $R^5$ is hydrogen and $R^{5'}$ is a $C_1$-$C_5$ hydrocarbyl radical optionally containing one or more oxygen, preferably one oxygen. For example, $R^5$ is hydrogen and $R^{5'}$ is a $C_1$-$C_5$ hydrocarbyl radical containing one or more oxygen, preferably one oxygen. It is preferred that each of $R^5$ and $R^{5'}$ is methoxy, ethoxy or isopropoxy. In one embodiment of the present invention, $R^5$ is hydrogen and $R^{5'}$ is methoxy.

$R^6$ and $R^{6'}$, which can be the same or different, are a branched $C_{3-20}$ hydrocarbyl radical.

In one embodiment of the present invention, $R^6$ and $R^{6'}$, which can be the same or different, are a tertiary $C_3$-$C_{20}$ hydrocarbyl radical. For example, $R^6$ and $R^{6'}$, which can be the same or different, are a tertiary $C_4$-$C_{20}$ hydrocarbyl radical.

In one embodiment of the present invention, $R^6$ and $R^{6'}$, which can be the same or different, are a tertiary $C_4$-$C_{10}$ hydrocarbyl radical. For example, $R^6$ and $R^{6'}$, which can be the same or different, are a tertiary $C_4$-$C_8$ hydrocarbyl radical.

In one embodiment of the present invention, $R^6$ and $R^{6'}$ are the same. In case $R^6$ and $R^{6'}$ are the same, it is appreciated that each $R^6$ and $R^{6'}$ is a tertiary $C_4$-$C_8$ hydrocarbyl radical. Preferably, each $R^6$ and $R^{6'}$ is a tertiary butyl radical or pentyl radical. For example, each $R^6$ and $R^{6'}$ is a tertiary butyl radical.

In one embodiment of the present invention, the solid catalyst preferably comprises a complex of formula (I)

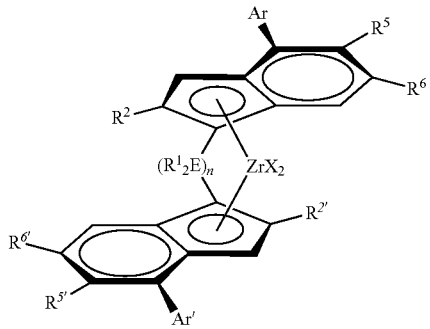

(I)

wherein
each X is a sigma ligand;
$R^1_2E$ is a divalent bridge selected from —$R^1_2C$—, —$R^1_2Si$—, —$R^1_2Ge$—, wherein each $R^1$ is independently a hydrogen atom, $C_1$-$C_{20}$ hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2;
$R^2$ and $R^{2'}$, which can be the same or different, are a linear $C_1$-$C_{10}$ hydrocarbyl radical optionally containing one or more heteroatoms from groups 14 to 16 (IUPAC);
Ar and Ar', which can be the same or different, are an aryl or heteroaryl group having up to 20 carbon atoms and is substituted in position 4 by $R^1$;
$R^5$ is hydrogen or a $C_1$-$C_{20}$ hydrocarbyl radical optionally containing one or more heteroatoms from groups 14 to 16 (IUPAC);
$R^{5'}$ is a $C_1$-$C_{20}$ hydrocarbyl radical optionally containing one or more heteroatoms from groups 14 to 16 (IUPAC);
$R^6$ and $R^{6'}$, which can be the same or different, are a tertiary $C_4$-$C_{20}$ hydrocarbyl radical.

In one embodiment of the present invention, the solid catalyst preferably comprises a complex of formula (I)

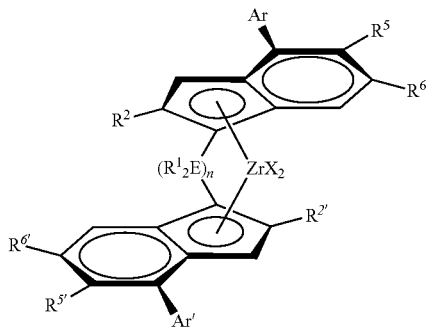

(I)

wherein
each X is a sigma ligand;
$R^1_2E$ is —$R^1_2Si$—, wherein each $R^1$ is independently a $C_{1-5}$-hydrocarbyl, and n has a value of 1;
each $R^2$ and $R^{2'}$ is a methyl radical;
Ar and Ar', which can be the same or different, are an aryl or heteroaryl group having up to 20 carbon atoms and no substituents in positions 3 and 5;
$R^5$ is hydrogen or a $C_1$-$C_{10}$ hydrocarbyl radical containing one or more heteroatoms from group 16 (IUPAC);

$R^{5'}$ is a $C_1$-$C_{10}$ hydrocarbyl group containing one or more heteroatoms from group 16 (IUPAC);
each $R^6$ and $R^{6'}$ is a tertiary butyl radical.

Alternatively, the solid catalyst preferably comprises a complex of formula (I)

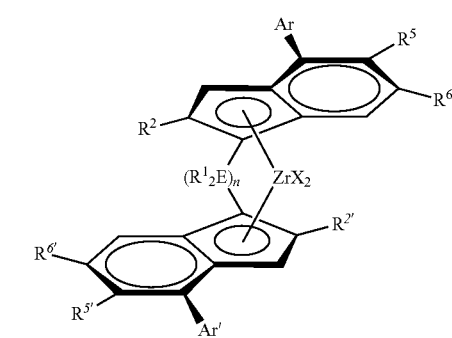

(I)

wherein
each X is a sigma ligand;
$R^1_2E$ is —$R^1_2Si$—, wherein each $R^1$ is independently a $C_{1-5}$-hydrocarbyl, and n has a value of 1;
each $R^2$ and $R^{2'}$ is a methyl radical;
Ar and Ar', which can be the same or different, are an aryl or heteroaryl group having up to 20 carbon atoms and is substituted in position 4 by $R^1$;
$R^5$ is hydrogen or a $C_1$-$C_{10}$ hydrocarbyl radical containing one or more heteroatoms from group 16 (IUPAC);
$R^{5'}$ is a $C_1$-$C_{10}$ hydrocarbyl group containing one or more heteroatoms from group 16 (IUPAC);
each $R^6$ and $R^{6'}$ is a tertiary butyl radical.

Representatives of catalysts of the above formulas include e.g. rac-1,1'-dimethylsilylene-bis[2-methyl-4-phenyl-5-methoxy-6-tert-butyl-indenyl]zirconium dichloride, anti-1,1'-dimethylsilylene-[2-methyl-4-phenyl-5-methoxy-6-tert-butyl-indenyl][2-methyl-4-phenyl-6-tert-butyl-indenyl] zirconium dichloride, and anti-1,1'-dimethylsilylene-[2-methyl-4-phenyl-5-methoxy-6-tert-butyl-indenyl][2-methyl-4-(4-tert-butylphenyl)-6-tert-butyl-indenyl] zirconium dichloride Throughout the disclosure above, where a narrower or preferred definition of a substituent is presented, that narrower or preferred definition is deemed disclosed in conjunction with all broader and narrower and preferred definitions of other substituents in the application.

The ligands required to form the complexes and hence catalysts of the invention can be synthesised by any process and the skilled organic chemist would be able to devise various synthetic protocols for the manufacture of the necessary ligand materials.

WO 2007/107448 A1, WO 2007/116034 A1 and WO2011/135004 A2 disclose the necessary chemistry and are herein incorporated by reference.

Cocatalyst

To form an active catalytic species it is normally necessary to employ a cocatalyst as is well known in the art. Cocatalysts comprising an organometallic compound of Group 13 (IUPAC) metal, like organoaluminium compounds used to activate metallocene catalysts are suitable for use in this invention.

The instant solid catalyst system comprises (i) a complex of Formula (I) as defined herein; and normally (ii) an aluminium alkyl compound (or other appropriate cocatalyst), or the reaction product thereof. Thus, the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_1-C_6-alkyl)_3$, can be used.

Boron based cocatalysts of interest include those of formula $$BY_3$$

wherein Y is the same or different and is an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine. Preferred examples for Y are fluorine, trifluoromethyl, p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris (3,5-difluorophenyl)borane and/or tris (3,4,5-trifluorophenyl)borane.

Particular preference is given to tris(pentafluorophenyl) borane.

It is preferred however that borates are used, i.e. compounds containing a borate 4-ion. Such ionic cocatalysts preferably contain a non-coordinating anion such as tetrakis (pentafluorophenyl)borate. Suitable counterions are triarylcarbenium or protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include: triphenylcarbenium tetrakis (pentafluorophenyl)borate, tributylammonium tetrakis(pentafluorophenyl)borate, tributylammonium tetrakis(trifluoromethylphenyl)borate, tributylammonium tetrakis(4-fluorophenyl)borate, N,N-dimethylcyclohexylammonium tetrakis(pentafluorophenyl)borate, N,N-dimethylbenzylammonium tetrakis(pentafluorophenyl)borate, N,N-dimethylanilinium tetrakis(pentafluorophenyl)borate, N,N-di(propyl) ammonium tetrakis(pentafluorophenyl)borate, di(cyclohexyl)ammonium tetrakis(pentafluorophenyl)borate, triphenylcarbenium tetrakis(pentafluorophenyl)borate, or ferrocenium tetrakis(pentafluorophenyl)borate.

Preference is given to triphenylcarbenium tetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4^{2-}$ is especially preferred.

Suitable amounts of cocatalyst will be well known to the skilled man.

Second Organometallic Compound

In some cases the catalyst system comprises optionally a second organometallic compound of a Group 13 metal (IUPAC) being different to the first organometallic compound. This second Group 13 metal organometallic compound has the specific functions of alkylating the metallocene complex, or acting as a scavenger for monomer impurities, or both. It can be added to the metallocene complex before it is reacted with the cocatalyst, or after the reaction with the cocatalyst, or it can be directly fed into the polymerization medium before the catalyst/cocatalyst mixture is added to it.

Preferably the second organometallic compound is an organometallic compound of B, Al, or Ga, more preferably an organometallic compound of B or Al, yet more preferably an organometallic compound of Al. Specific preferred organometallic compounds are selected from the group consisting of aluminium trialkyls, such as aluminium triethyl, aluminium tri-isobutyl, aluminium trioctyl and the like.

The catalyst system of the invention is preferably used in solid form and thus is used as a heterogeneous catalyst system.

The catalyst system of the invention can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components dispersed in a solvent so as to form dispersed droplets; and (b) solid particles are formed by solidifying said dispersed droplets.

Reference is made to WO2006/069733 and EP 1 117 334.4 describing principles of such a continuous or semi-continuous preparation method of the solid catalyst types, prepared via emulsion/solidification method.

Polymerisation

The polymerization of propylene by using the above defined solid catalyst system may be effected in one or more, e.g. 1, 2 or 3, polymerization reactors, using conventional polymerization techniques, e.g. gas phase, solution phase, slurry or bulk polymerization.

In general, a combination of slurry (or bulk) and at least one gas phase reactor is often preferred, particularly with the reactor order being slurry (or bulk) then one or more gas phase reactors.

In one embodiment of the present invention the polymerization of propylene is effected in liquid monomer slurry phase.

In one embodiment of the present invention, the polymerization temperature is of less than 60° C., like not more than 55° C. For example, the polymerization temperature is from 10 to less than 60° C., e.g. from 10 to 55° C., more preferably from 15 to 50° C., still more preferably from 15 to 45° C., yet more preferably from 20 to 40° C. and most preferably from 25 to 35° C.

For polymerizations in liquid monomer slurry phase, the reaction temperature will generally be in the range from 10 to 55° C., preferably in the range from 15 to 50° C., like in the range of 10 to 50° C., e.g. 20 to 40° C. The reactor pressure will generally be in the range from 5 to 80 bar (e.g. 20 to 60 bar), and the residence time will generally be in the range from 0.1 to 5 hours (e.g. 0.3 to 2 hours).

Generally the quantity of solid catalyst system used will depend upon the nature of the catalyst, the reactor types and conditions and the properties desired for the propylene homopolymer (H-PP1). As well known in the art, hydrogen can be used for controlling the molecular weight of the propylene homopolymer.

It is a feature of the invention that the claimed propylene homopolymer (H-PP1) obtainable, preferably obtained, by the process of the present invention has specific features as defined above.

The polypropylene homopolymer (H-PP1) or the polypropylene blend (PB) of the present invention, preferably made by the catalysts of the invention, are useful in all kinds of end articles such as pipes, sheets, films (cast, blown or BOPP films, such as for example BOPP for capacitor film), fibres, moulded articles (e.g. injection moulded, blow moulded, rotomoulded articles), extrusion coatings and so on.

The invention will now be illustrated by reference to the following non-limiting examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity and regio-regularity of the polypropylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^{1}H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects on the quantification of the tacticity distribution was corrected for by subtraction of representative regio-defect integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

Number Average Molecular Weight ($M_n$), Weight Average Molecular Weight ($M_w$) and Molecular Weight Distribution (MWD)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 µL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

$MFR_2$ (230° C.) is measured according to ISO 1133 (230° C., 2.16 kg load)

The xylene soluble fraction at room temperature (XS, wt.-%): The amount of the polymer soluble in xylene is determined at 25° C. according to ISO 16152; first edition; 2005-07-01.

DSC analysis, melting temperature ($T_m$) and crystallization temperature ($T_c$): measured with a TA Instrument Q200 differential scanning calorimetry (DSC) on 5 to 7 mg samples. DSC is run according to ISO 3146/part 3/method C2 in a heat/cool/heat cycle with a scan rate of 10° C./min in the temperature range of −30 to +225° C. Crystallization temperature is determined from the cooling step, while melting temperature is determined from the second heating step.

Tensile measurements: Stress-strain curves have been generated with a Zwick Z010 instrument according to ISO 527-1,2, on specimens cut out from compression moulded 100×100×2 mm plates, using test speed of 1 mm/min for tensile modulus (up to 0.25% deformation) and 50 mm/min for the rest of the test. The tensile modulus (Et) was determined from the slope of the stress strain curve σ(ε) in the strain interval 0.05%≤ε≤0.25%, calculated as secant slope in this interval:

$$E_t = \frac{\sigma_2 - \sigma_1}{\varepsilon_2 - \varepsilon_1}$$

where Et is the tensile modulus, expressed in megapascales; $\sigma_1$ is the stress, in megapascales, measured at the strain value $\varepsilon_1$=0.0005 (0.05%); $\varepsilon_2$ is the stress, in megapascales, measured at the strain value $\varepsilon_2$=0.0025 (0.25%).

B. Examples

MAO Chemtura (30 wt % in toluene) or Albemarle (30 wt % in toluene) were used as received.

Surfactant: The mixture of perfluoroalkylethyl acrylate esters (CAS 65605-70-1) used as the surfactant was purchased from the Cytonix corporation or Wilshire Technologies, dried over activated molecular sieves (2 times) and degassed by argon bubbling prior to use. Perfluoro-1,3-dimethylcyclohexane (PFC, CAS 335-27-3) was dried over activated molecular sieves (2 times) and degassed by argon bubbling prior to use.

B.1 Preparation of the Used Solid Catalyst Systems

Solid Catalyst System C1 (Comparative):

The metallocene was prepared according to the procedure described in Spaleck et al. Organometallics 1994, 13, 954 with rac-1,1'-dimethylsilylene-bis[2-methyl-4-phenyl-indenyl]zirconium dichlorides (metallocene 1).

The detailed catalyst preparation was performed as follows:

Inside the glovebox, 80 μL of dry and degassed surfactant were mixed with 2 mL of 30 wt % MAO solution in toluene (Albemarle) in a septum bottle and left to react overnight under stirring. The following day, 47.8 mg of metallocene 1 (0.076 mmol, 1 equivalent) were dissolved with 4 mL of MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of perfluoro-1,3-dimethylcyclohexane at −10° C. and equipped with an overhead stirrer (stirring speed=600 rpm). Total amount of MAO is 5 mL (300 equivalents). A red-orange emulsion formed immediately and stirred during 15 minutes at −10° C./600 rpm. Then the emulsion was transferred via a 2/4 teflon tube to 100 mL of hot perfluoro-1,3-dimethylcyclohexane at 90° C., and stirred at 600 rpm until the transfer is completed, then the speed was reduced to 300 rpm. After 15 minutes stirring, the oil bath was removed and the stirrer turned off. The catalyst was left to settle up on top of the perfluoro-1,3-dimethylcyclohexane and after 35 minutes the solvent was siphoned off. The remaining orange catalyst was dried during 2 hours at 50° C. under argon flow. 0.51 g of a red free flowing powder (C1) was obtained.

Solid Catalyst System C2 (Inventive)

The metallocene rac-1,1'-dimethylsilylene-bis[2-methyl-4-phenyl-5-methoxy-6-tert-butylindenyl] zirconium dichloride was prepared according to the procedure described in WO 2007/116034 (metallocene 2).

The detailed catalyst preparation was performed as follows:

Inside the glovebox, 80 μL of dry and degassed surfactant was mixed with 2 mL of 30 wt % MAO solution in toluene (Albemarle) in a septum bottle and left to react overnight under stirring. The following day, inside the glovebox, 60.9 mg of metallocene 2 was mixed with 4 ml of MAO solution in a septum bottle and the solution was stirred for 60 minutes. After, 4 mL of the MAO-metallocene solution and 1 mL of the surfactant-MAO solution were successively added into a 50 mL emulsification glass reactor containing 40 mL of perfluoro-1,3-dimethylcyclohexane at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot perfluoro-1,3-dimethylcyclohexane at 90° C. and stirred at 600 rpm until the transfer is completed. Then the speed was reduced to 300 rpm. After 15 minutes stirring, the oil bath was removed and the stirrer turned off. The catalyst was left to settle up on top of the perfluoro-1,3-dimethylcyclohexane and after 35 minutes the solvent was siphoned off. The remaining red catalyst was dried during 2 hours at 50° C. under argon flow and 0.60 g of a red powder (C2) was obtained.

Solid Catalyst System C3 (Inventive)

The metallocene anti-1,1'-dimethylsilylene-[2-methyl-4-phenyl-6-tert-butyl-indenyl][2-methyl-4-phenyl-5-methoxy-6-tert-butyl-indenyl]zirconium dichloride was prepared according to the procedure described in WO2013007650 (Metallocene E1) (metallocene 3). The detailed catalyst preparation was performed as follows:

Inside the glovebox, 80 μL of dry and degassed surfactant were mixed with 2 mL of 30 wt % MAO solution in toluene (Albemarle) in a septum bottle and left to react overnight under stirring. The following day, 44.2 mg of metallocene 3 (0.057 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of perfluoro-1,3-dimethylcyclohexane at −10° C. and equipped with an overhead stirrer (stirring speed=600 rpm). Total amount of MAO is 5 mL (400 equivalents). A red emulsion formed immediately and stirred during 15 minutes at −10° C./600 rpm. Then the emulsion was transferred via a 2/4 teflon tube to 100 mL of hot of perfluoro-1,3-dimethylcyclohexane at 90° C., and stirred at 600 rpm until the transfer is completed, then the speed was reduced to 300 rpm. After 15 minutes stirring, the oil bath was removed and the stirrer turned off. The catalyst was left to settle up on top of the perfluoro-1,3-dimethylcyclohexane and after 35 minutes the solvent was siphoned off. The remaining red catalyst was dried during 2 hours at 50° C. under argon flow. 0.63 g of a red free flowing powder (C3) was obtained.

Solid Catalyst System C4 (Inventive)

Inside the glovebox, 80 μL of dry and degassed surfactant were mixed with 2 mL of 30 wt % MAO solution in toluene (Chemtura) in a septum bottle and left to react overnight under stirring. The following day, 60.9 mg of metallocene 2 (0.076 mmol, 1 equivalent) were dissolved with 4 mL of the MAO solution in another septum bottle and left to stir inside the glove box. After 60 minutes, 1 mL of the surfactant solution and 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 Teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle on top of the PFC and after 35 minutes the solvent was siphoned off. The remaining catalyst was dried during 2 hours at 50° C. under argon flow. 0.64 g of a red solid catalyst was obtained.

B.2 Off-Line Pre-Polymerization of the Used Solid Catalyst Systems

The catalysts C1, C2, C3 and C4 were pre-polymerised according to the following procedure:

Off-line pre-polymerisation experiments were done in a 125 mL pressure reactor equipped with gas-feeding lines and an overhead stirrer. Dry and degassed perfluoro-1,3-dimethylcyclohexane (15 cm$^3$) and the desired amount of catalyst to be pre-polymerised were loaded into the reactor inside a glovebox and the reactor was sealed. The reactor was then taken out from the glovebox and placed inside a water cooled bath. The overhead stirrer and the feeding lines were then connected. For the prepolymerization of the catalysts C1, C3 and the catalyst C2 as applied for the preparation of propylene homopolymers in a 480-mL reactor, the feeding line was pressurized with hydrogen, and the experiment was started by opening the valve between the H$_2$ feed line and the reactor. At the same time propylene feed was started through the same H$_2$ feeding line in order to ensure that all the hydrogen would be fed into the reactor. For the prepolymerization of the catalyst C2 as applied for the preparation of propylene homopolymers in a 20-L reactor and the catalyst C4, no H$_2$ was fed into the reactor. The propylene feed was left open, and the monomer consumption was compensated by keeping the total pressure in the reactor constant (about 5 barg). The experiment was continued until a polymerisation time sufficient to provide the desired degree of polymerisation. The reactor was then taken back inside the glovebox before opening and the content was poured into a glass vessel. The perfluoro-1,3-dimethylcyclohexane was evaporated until a constant weight was obtained to yield a pre-polymerised pink catalyst.

The details regarding the off-line pre-polymerization experiments are listed in Table 1 below:

TABLE 1

| Catalyst synthesis lot | Catalyst [mg] | prepolymerization time [min] | Yield* [mg] | DP** [g/g] |
|---|---|---|---|---|
| C1 | 314.5 | 13 | 1659 | 4.3 |
| C2 | 544.3 | 11 | 2297 | 3.2 |
| C3 | 591.0 | 17 | 2683 | 3.5 |
| C4 | 497.4 | 11 | 1384 | 1.8 |

*total mass of prepped catalyst
**The pre-polymerisation degree (DP) was calculated using the following formula:

$$\text{Pre-polymerisation degree (DP)} = \frac{\text{total yield (mg)} - \text{catalyst (mg)}}{\text{catalyst (mg)}}$$

B.3 Preparation of Propylene Homopolymers in a 480 mL Reactor

Propylene was provided by Borealis and adequately purified before use. Triethylaluminum was purchased from Chemtura and diluted to a concentration of 0.5 molar with heptane. Hydrogen is provided by Air Liquide.

The dosing of the catalyst was carried out in that the respective amount of catalyst C1, C2 or C3 was weighted into a metal vial. 6 ml of hexane was added to each vial to create a catalyst suspension. From each vial the volume required to reach an amount of 10 mg of catalyst was taken up (ca. 2 ml) and injected into the reactor.

The polymerizations were performed in a 480 mL reactor. 100 μl of triethylaluminum was fed as a 0.5 M solution of dry and degassed heptane. 100 g of liquid propylene was fed into the reactor and the desired amount of hydrogen was then pressurized into the reactor. The contacting time of triethylaluminum and propylene was 20 min. The temperature was set to 20 or 30° C. The catalyst slurry having a catalyst concentration of 3.3 mg/ml in hexane was then injected into the reactor and temperature raised to 20 to 30° C. At this temperature, a pre-polymerization was conducted for 5 minutes. Then, the reactor was heated up to the polymerization temperature for 30 or 60 minutes. The polymerization was stopped by venting the reactor and flushing with nitrogen before the polymer was collected.

The details regarding the procedure are also outlined in Table 2 below:

TABLE 2

| Catalyst | | C1 and C2 | C3 |
|---|---|---|---|
| reactor volume | [mL] | 480 | |
| Propylene | [g] | 100 | |
| TEAL 0.5M in heptane | [mL] | 0.1 | |
| Cat injection solvent | type | hexane | |
| Catalyst slurry concentration | [mg/ml] | 3.3 | |
| Contact time hexane-catalyst | [min] | <30 min | |
| Cat injection Temperature | [° C.] | 20 | 30 |
| Prepoly Temperature | [° C.] | 20 | 30 |
| Prepoly time | [min] | 5 | 0 |
| Polymerization time | [min] | 60 | 30 |
| H$_2$ | [mL] | 0 | 60-105 |

The detailed polymerization conditions for experiments conducted with C1 (comparative) are outlined in Table 3 below:

TABLE 3

| Sample ID | catalyst amount* [mg] | Polymerization Temperature [° C.] | yield [g] | Polymerization activity [kg/g$_{cat}$/h] |
|---|---|---|---|---|
| 1 | 20.00 | 30 | 1.9 | 0.5 |
| 2 | 10.00 | 40 | 3.1 | 1.7 |
| 3 | 6.00 | 50 | 3.9 | 3.4 |
| 4 | 6.00 | 60 | 6.6 | 5.8 |
| 5 | 6.00 | 70 | 4.5 | 4.0 |
| 6 | 6.00 | 80 | 2.8 | 2.5 |
| 7 | 6.00 | 85 | 1.6 | 1.4 |
| 8 | 6.00 | 75 | 4.4 | 3.9 |

*off-line pre-polymerized

The detailed polymerization conditions for experiments conducted with C2 (inventive) are outlined in Table 4 below:

TABLE 4

| Sample ID | catalyst amount* [mg] | Polymerization Temperature [° C.] | yield [g] | Polymerization activity [kg/g$_{cat}$/h] |
|---|---|---|---|---|
| 1 | 9.96 | 30 | 3.4 | 1.4 |
| 2 | 5.08 | 40 | 4.2 | 3.5 |
| 3 | 2.99 | 50 | 5.5 | 7.7 |

*off-line pre-polymerized

The detailed polymerization conditions for experiments conducted with C3 (inventive) are outlined in Table 5 below:

TABLE 5

| Sample ID | catalyst amount* [mg] | Polymerization Temperature [° C.] | H$_2$ [ml] | yield [g] | Polymerization activity [kg/g$_{cat}$/h] |
|---|---|---|---|---|---|
| 1 | 3.33 | 50 | 100 | 6.0 | 16.2 |

*off-line pre-polymerized

The sample characterization results for experiments conducted with C1 (comparative), C2 (inventive) and C3 (inventive) are outlined in tables 6, 7 and 8 below.

TABLE 6

| Sample ID | catalyst | Tm [° C.] | Tc [° C.] | mmmm [%] | mrrm [%] | 2,1e [%] | 3,1 [%] | total regio errors [%] | total errors [%] | Mn [kg/mol] | Mw [kg/mol] | Mv [kg/mol] | Mw/Mn [—] |
|---|---|---|---|---|---|---|---|---|---|---|---|---|---|
| 1 | C1 | 142.7 | 106.2 | 98.75 | 0.25 | 1.72 | 0 | 1.72 | 1.97 | 304 | 773 | 707 | 2.54 |
| 2 | C1 | 145.0 | 105.5 | 98.95 | | | | | | 410 | 977 | 894 | 2.38 |
| 3 | C1 | 146.9 | 107.1 | 99.04 | 0.19 | 1.21 | 0 | 1.21 | 1.4 | 444 | 1046 | 957 | 2.36 |
| 4 | C1 | 148.7 | 106.9 | 99.24 | 0.15 | 1.04 | 0 | 1.04 | 1.19 | 416 | 987 | 903 | 2.37 |
| 5 | C1 | 150.5 | 106.9 | 98.5 | | | | | | 303 | 794 | 720 | 2.62 |
| 6 | C1 | 151.5 | 107.3 | 98.65 | 0.27 | 0.84 | 0.01 | 0.85 | 1.12 | 243 | 687 | 620 | 2.83 |
| 7 | C1 | 151.0 | 109.2 | 98.6 | 0.28 | 0.86 | 0.01 | 0.87 | 1.15 | 197 | 566 | 509 | 2.87 |
| 8 | C1 | 150.7 | 106.2 | 98.95 | 0.21 | 0.92 | 0 | 0.92 | 1.13 | 308 | 802 | 728 | 2.60 |

TABLE 7

| Sample ID | catalyst | Tm [° C.] | Tc [° C.] | mmmm [%] | mrrm [%] | 2,1e [%] | 3,1 [%] | total regio errors [%] | total errors [%] | Mn [kg/mol] | Mw [kg/mol] | Mv [kg/mol] | Mw/Mn [—] |
|---|---|---|---|---|---|---|---|---|---|---|---|---|---|
| 1 | C2 | 132.2 | 95.9 | 99 | 0.2 | 3.06 | 0 | 3.06 | 3.26 | 399 | 1048 | 943 | 2.63 |
| 2 | C2 | 134.6 | 97.1 | 99.39 | 0.12 | 2.59 | 0 | 2.59 | 2.71 | 502 | 1247 | 1127 | 2.48 |
| 3 | C2 | 138.0 | 99.4 | 99.49 | 0.1 | 2.21 | 0 | 2.21 | 2.31 | 566 | 1394 | 1256 | 2.46 |

TABLE 8

| Sample ID | catalyst | Tm [° C.] | Tc [° C.] | mmmm [%] | rr [%] | 2,1e [%] | 3,1 [%] | total regio errors [%] | total errors [%] | Mn [kg/mol] | Mw [kg/mol] | Mv [kg/mol] | Mw/Mn [—] |
|---|---|---|---|---|---|---|---|---|---|---|---|---|---|
| 1 | C3 | 138.0 | 101.3 | 99.2 | 0.15 | 2.31 | 0.01 | 2.32 | 2.47 | 280 | 753 | 682 | 2.7 |

It is evident that the C2 and the C3 catalysts produce polypropylene homopolymers with a new property combination, i.e. that is low melting point (below 150° C.) and a high molecular weight (above 100 kg/mol). The melting point of PP is connected to the amount of chain defects (regio- and stereoerrors). $^{13}$C NMR analysis of the samples of tables 1-3 has shown that most of these chain defects are regio-defects of the 2,1-erythro type (see tables 6-8). By increasing the polymerization temperature $T_m$, the number of regioerrors decreases, which is in turn reflected in an increase of the melting temperature (see FIG. 1). It is further to be noted that the amount of 2,1-erythro regio-defects for the inventive catalyst C2, at any given polymerization temperature $T_m$, is higher compared to the comparative catalyst C1.

B.4 Preparation of Propylene Homopolymers in a 20-L Reactor

Propylene was provided by Borealis and adequately purified before use. Triethylaluminum was purchased from Aldrich as a 1 M solution in hexane. Hydrogen is provided by Air Liquide.

The polymerizations were performed in a 20 L reactor.

Polymerization of Propylene with Catalyst C2 at 30° C. (Inventive):

A stirred autoclave (double helix stirrer) with a volume of 21.2 dm$^3$ containing 0.2 barg propylene is filled with additional 3.97 kg propylene. After adding of 0.73 mmol triethylaluminium (Aldrich, 1 molar solution in n-hexane) using a stream of 250 g propylene, the solution is stirred at 30° C. and 250 rpm for 20 min. Then the catalyst is injected as described in the following. The solid, pre-polymerized catalyst (type, amount and degree of polymerisation as listed in the tables) is loaded into a 5-mL stainless steel vial inside the glovebox, the vial is attached to the autoclave, then a second 5-mL vial containing 4 ml n-hexane and pressurized with 10 bars of N$_2$ is added on top, the valve between the two vials is opened and the solid catalyst is contacted with hexane under N$_2$ pressure for 2 s, then flushed into the reactor with 250 g propylene. Stirring speed is increased to 250 rpm. Afterwards the desired H$_2$ amount is added with a defined flow via thermal mass flow controller. The reactor temperature is held constant throughout the polymerization. The polymerization time is measured starting when the hydrogen is added. Then the reaction is stopped by adding 5 ml methanol, cooling the reactor and flashing the volatile components. After flushing the reactor twice with $N_2$ and one vacuum/$N_2$ cycle, the product is taken out and dried overnight in a hood. 100 g of the polymer is additivated with 0.2 wt % Ionol and 0.1 wt.-% PEPQ (dissolved in acetone) and dried overnight in a hood followed by 2 hours in a vacuum drying oven at 60° C.

Polymerization of Propylene with Catalyst C4 at 55° C.:

A stirred autoclave (double helix stirrer) with a volume of 21.2 dm³ containing 0.2 barg propylene is filled with additional 3.97 kg propylene. After adding of 0.73 mmol triethylaluminium (Aldrich, 1 molar solution in n-hexane) using a stream of 250 g propylene, the solution is stirred at 20° C. and 250 rpm for 20 min, then the reactor is brought up to the set prepolymerization temperature (HB-Therm) and the catalyst is injected as described in the following. The solid, pre-polymerized catalyst (type, amount and degree of polymerisation as listed in the tables) is loaded into a 5-mL stainless steel vial inside the glovebox, the vial is attached to the autoclave, then a second 5-mL vial containing 4 ml n-hexane and pressurized with 10 bars of $N_2$ is added on top, the valve between the two vials is opened and the solid catalyst is contacted with hexane under $N_2$ pressure for 2 s, then flushed into the reactor with 250 g propylene. Stirring speed is increased to 250 rpm and pre-polymerisation is run for the set time. At the end of the prepolymerization step the stirring speed is increased to 350 rpm. Now the target polymerisation temperature of 55° C., respectively, is adjusted. When the internally reactor temperature value is 51° C., respectively, the desired $H_2$ amount is added with a defined flow via thermal mass flow controller. The reactor temperature is held constant throughout the polymerization. The polymerization time is measured starting when the temperature is 2° C. below the set polymerization temperature. Then the reaction is stopped by adding 5 ml methanol, cooling the reactor and flashing the volatile components.

After flushing the reactor twice with $N_2$ and one vacuum/$N_2$ cycle, the product is taken out and dried overnight in a hood. 100 g of the polymer is additivated with 0.2 wt % Ionol and 0.1 wt.-% PEPQ (dissolved in acetone) and dried overnight in a hood followed by 2 hours in a vacuum drying oven at 60° C.

The relevant polymerisation conditions and polymerisation results of the three PP homopolymers prepared by liquid propylene polymerization at with catalyst C2 at 30° C. (inventive) and with catalyst C4 at 55° C. are described in Table 10 and Table 11. All homopolymers have been additivated with 1500 ppm of B225 and 500 ppm of CaSt, and pelletized on a twin-screw extruder Prism TSE-16TC.

TABLE 10

| Sample ID | catalyst | catalyst amount [mg] | propylene [g] | T [° C.] | $H_2$ [NL] | time [min] | yield [g] |
|---|---|---|---|---|---|---|---|
| 9 | C2 | 188.5 | 4436 | 30 | 0.40 | 360 | 716 |
| 2 | C4 | 102.0 | 4421 | 55 | 2.72 | 134 | 1459 |

TABLE 11

| Sample ID | catalyst | Tc [° C.] | Tm [° C.] | [2,1e] [%] | [2,1t] [%] | [3,1] [%] | [mrrm] [%] | total defects [%] | Tensile modulus [MPa] | Tensile strain at break [%] | Work at break [J] |
|---|---|---|---|---|---|---|---|---|---|---|---|
| 9 | C2 | 93.3 | 132.0 | 3.3 | 0 | 0 | 0.2 | 3.5 | 1113 | 611 | 21.0 |
| 2 | C4 | 103.2 | 142.5 | 2.0 | 0 | 0 | 0.1 | 2.1 | 1639 | 415 | 9.7 |

Mechanical Characterization: Tensile

Mechanical characterisation was performed as defined above. The results of the tensile measurements show that the polypropylene homopolymer of the invention has a much higher toughness as measured by the work at break value (work necessary to break the polymer specimen), higher ductility as measured by the tensile strain at break and lower tensile modulus, compared to the propylene homopolymers produced with the same catalyst but produced at higher polymerisation temperature.

The invention claimed is:
1. A polypropylene homopolymer (H-PP1), having
   a) a melting temperature $T_m$ in the range of 120 to less than 150° C.,
   b) 2,1 erythro regio-defects of above 2.0% and up to 3.3%, as determined by $^{13}$C-NMR spectroscopy,
   c) a total amount of defects in the polymer chain defined by the sum of 2,1 erythro regio-defects, 2,1 threo regio-defects, 3,1 regio-defects, and mrrm pentad content of above 2.2% and up to 3.5%, as determined by $^{13}$C-NMR spectroscopy, and
   d) a weight average molecular weight $M_w$ in the range of 100 to 2,000 kg/mol.
2. The polypropylene homopolymer (H-PP1) according to claim 1, having
   a) a melting temperature $T_m$ of 120 to less than 145° C.; and/or
   b) a weight average molecular weight $M_w$ in the range of 200 to 2,000 kg/mol.
3. The polypropylene homopolymer (H-PP1) according to claim 1, having
   a) a melting temperature $T_m$ of 120 to less than 140° C.; and/or
   b) a weight average molecular weight $M_w$ in the range of 300 to 2,000 kg/mol.
4. The polypropylene homopolymer (H-PP1) according to claim 1, having
   a) a melting temperature $T_m$ of from 120 to 142° C.; and/or
   b) a weight average molecular weight $M_w$ of from 300 to 2,000 kg/mol.
5. The polypropylene homopolymer (H-PP1) according to claim 1, having
   a) a mrrm pentad content of equal to or lower than 1.0% as determined by $^{13}$C-NMR spectroscopy; and/or
   b) 3,1 regio-defects of less than 0.6% as determined by $^{13}$C-NMR spectroscopy;

and/or c) a xylene soluble (XS) fraction content of below 1.0 wt %.

6. A polypropylene blend (PB) comprising a polypropylene homopolymer (H-PP1) as defined in claim 1 and a second propylene homopolymer (H-PP2), said second propylene homopolymer (H-PP2) has a melting temperature $T_m$ at least 5° C. higher.

7. The polypropylene blend (PB) according to claim 6, wherein the propylene homopolymer (H-PP2) has (a) a melting temperature ($T_m$) of at least 140 C;
and/or
(b) 2,1 regio-defects and/or 2,1-erythro regio-defects equal or below 1.8%;
and/or
(c) a weight average molecular weight $M_w$ of above 100 kg/mol;
and/or
(d) polydispersity index (Mw/Mn) of at least 2.0.

8. A polypropylene blend (PB) according to claim 6, wherein (a) the propylene homopolymer (H-PP1) and the second propylene homopolymer (H-PP2) are the only polymer components in the polypropylene blend (PB),
and/or
(b) the weight ratio between the propylene homopolymer (H-PP1) and the second propylene homopolymer (H-PP2) is in the range of 10/90 to 90/10.

9. A pipe, sheet, film, fiber, moulded article or extrusion coating comprising a polypropylene homopolymer (H-PP1) according to claim 1.

10. A cast, blown, or biaxially oriented polypropylene film comprising the polypropylene homopolymer (H-PP1) according to claim 1.

11. A process for the preparation of a polypropylene homopolymer (H-PP1) according to claim 1, comprising the step of polymerizing propylene at a polymerization temperature of equal or below 55° C. in the presence of a solid catalyst system, said solid catalyst system comprises (i) a complex of formula (I)

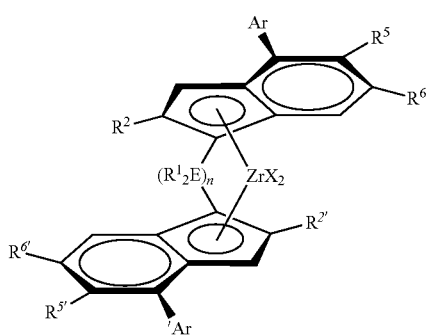

wherein
each X is a sigma ligand;
$R^1{}_2E$ is a divalent bridge selected from —$R^1{}_2C$—, —$R^1{}_2Si$—, —$R^1{}_2Ge$—, wherein each $R^1$ is independently a hydrogen atom, $C_1$-$C_{20}$ hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2;
$R^2$ and $R^{2'}$, which can be the same or different, are a linear $C_1$-$C_{20}$ hydrocarbyl radical optionally containing one or more heteroatoms from groups 14 to 16 (IUPAC);
Ar and Ar', which can be the same or different, are an aryl or heteroaryl group having up to 20 carbon atoms;
$R^5$ is hydrogen or a $C_1$-$C_{40}$ hydrocarbyl radical optionally containing one or more heteroatoms from groups 14 to 16 (IUPAC);
$R^{5'}$ is a $C_{1-40}$ hydrocarbyl radical optionally containing one or more heteroatoms from groups 14 to 16 (IUPAC); and
$R^6$ and $R^{6'}$, which can be the same or different, are a tertiary $C_{4-20}$ hydrocarbyl radical optionally containing one or more heteroatoms from groups 14 to 16 (IUPAC); and (ii) a cocatalyst comprising a first organometallic compound of a Group 13 metal (IUPAC).

12. The process according to claim 11, wherein
each X is a sigma ligand;
$R^1{}_2E$ is a divalent bridge selected from —$R^1{}_2C$—, —$R^1{}_2Si$—, —$R^1{}_2Ge$—, wherein each $R^1$ is independently a hydrogen atom, $C_1$-$C_{20}$ hydrocarbyl, tri($C_{1-20}$-alkyl)silyl, $C_6$-$C_{20}$ aryl, $C_7$-$C_{20}$ arylalkyl or $C_7$-$C_{20}$ alkylaryl, and n has a value from 1 to 2;
$R^2$ and $R^{2'}$, which can be the same or different, are a linear $C_1$-$C_{10}$ hydrocarbyl radical optionally containing one or more heteroatoms from groups 14 to 16 (IUPAC);
Ar and Ar', which can be the same or different, are an aryl or heteroaryl group having up to 20 carbon atoms and is substituted in position 4 by R';
$R^5$ is hydrogen or a $C_1$-$C_{20}$ hydrocarbyl radical optionally containing one or more heteroatoms from groups 14 to 16 (IUPAC);
$R^{5'}$ is a $C_1$-$C_{20}$ hydrocarbyl radical optionally containing one or more heteroatoms from groups 14 to 16 (IUPAC);
$R^6$ and $R^{6'}$, which can be the same or different, are a tertiary $C_4$-$C_{20}$ hydrocarbyl radical.

13. The process according to claim 11, wherein
each X is a sigma ligand;
$R^1{}_2E$ is —$R^1{}_2Si$—, wherein each $R_1$ is independently a $C_{1-5}$-hydrocarbyl, and n has a value of 1;
each $R^2$ and $R^{2'}$ is a methyl radical;
Ar and Ar', which can be the same or different, are an aryl or heteroaryl group having up to 20 carbon atoms and no substituents in positions 3 and 5;
$R^5$ is hydrogen or a $C_1$-$C_{10}$ hydrocarbyl radical containing one or more heteroatoms from group 16 (IUPAC);
$R^{5'}$ is a $C_1$-$C_{10}$ hydrocarbyl group containing one or more heteroatoms from group 16 (IUPAC);
each $R^6$ and $R^{6'}$ is a tertiary butyl radical.

14. The process according to claim 11, wherein the polymerization temperature is from 10 to less than 55° C.

* * * * *